US012232143B2

(12) United States Patent
Lei et al.

(10) Patent No.: US 12,232,143 B2
(45) Date of Patent: *Feb. 18, 2025

(54) NESTING CONFIGURED GRANT—SMALL DATA TRANSFER OCCASIONS

(71) Applicant: QUALCOMM Incorporated, San Diego, CA (US)

(72) Inventors: Jing Lei, San Diego, CA (US); Linhai He, San Diego, CA (US); Yongjun Kwak, San Diego, CA (US); Krishna Kiran Mukkavilli, San Diego, CA (US); Huilin Xu, Temecula, CA (US); Yuchul Kim, San Diego, CA (US); Wanshi Chen, San Diego, CA (US); Hwan Joon Kwon, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/396,327

(22) Filed: Dec. 26, 2023

(65) Prior Publication Data

US 2024/0205926 A1 Jun. 20, 2024

Related U.S. Application Data

(63) Continuation of application No. 17/443,877, filed on Jul. 28, 2021, now Pat. No. 11,895,665.

(Continued)

(51) Int. Cl.
*H04W 4/00* (2018.01)
*H04W 72/23* (2023.01)

(52) U.S. Cl.
CPC .................................. *H04W 72/23* (2023.01)

(58) Field of Classification Search
CPC ..... H04W 72/23; H04W 76/27; H04W 76/10; H04W 74/0808
See application file for complete search history.

(56) References Cited

U.S. PATENT DOCUMENTS 11,159,929 B2 * 10/2021 Ye ........................... H04W 4/80
11,228,990 B2 * 1/2022 Jeon ...................... H04W 52/50
(Continued)

FOREIGN PATENT DOCUMENTS

EP 3876625 A1 9/2021
EP 3905825 A1 11/2021
(Continued)

OTHER PUBLICATIONS

3GPP TS 38.331: "3rd Generation Partnership Project; Technical Specification Group Radio Access Network; NR; Radio Resource Control (RRC) Protocol Specification (Release 16)", 3GPP TS 38.331, 3rd Generation Partnership Project, Mobile Competence Centre, 650, Route Des Lucioles, F-06921 Sophia-Antipolis Cedex, France, vol. RAN WG2, No. V16.1.0, Jul. 24, 2020, pp. 1-910, XP051925836, p. 382-388, 168, paragraph 5.6 UE capabilities—p. 192, paragraph 5.7.4.3a Setting the contents of OverheatingAssist, figures 5.6.1.1-1, 5.7.4.1-1.

(Continued)

*Primary Examiner* — Abdelnabi O Musa
(74) *Attorney, Agent, or Firm* — Harrity & Harrity, LLP

(57) ABSTRACT

Various aspects of the present disclosure generally relate to wireless communication. In some aspects, a user equipment (UE) may receive, from a base station, a configuration message that indicates a radio resource allocation and a transmission scheme for one or more first configured grant-small data transfer (CG-SDT) occasions and one or more second CG-SDT occasions. The one or more second CG-SDT occasions are at least partially nested, in time, frequency, or a combination thereof, within the one or more (Continued)

first CG-SDT occasions. The UE may therefore transmit, to the base station, an uplink communication within the one or more first CG-SDT occasions or the one or more second CG-SDT occasions, using the radio resource allocation and the transmission scheme. Numerous other aspects are provided.

20 Claims, 13 Drawing Sheets

Related U.S. Application Data

(60) Provisional application No. 62/706,078, filed on Jul. 30, 2020.

(56) References Cited

U.S. PATENT DOCUMENTS

| | | | | |
|---|---|---|---|---|
| 11,470,488 | B1 * | 10/2022 | Babaei | H04L 1/1887 |
| 2020/0068546 | A1 | 2/2020 | Wu et al. | |
| 2020/0196349 | A1 * | 6/2020 | He | H04W 72/1268 |
| 2021/0315049 | A1 * | 10/2021 | Wei | H04W 76/36 |
| 2021/0337625 | A1 * | 10/2021 | Tsai | H04W 76/27 |
| 2021/0410180 | A1 * | 12/2021 | Tsai | H04L 1/1819 |
| 2022/0039146 | A1 * | 2/2022 | Lei | H04W 72/23 |
| 2022/0039147 | A1 * | 2/2022 | Lei | H04W 8/24 |
| 2022/0124780 | A1 * | 4/2022 | Lei | H04L 1/1893 |
| 2022/0416990 | A1 | 12/2022 | Tsai et al. | |

FOREIGN PATENT DOCUMENTS

| | | | | |
|---|---|---|---|---|
| EP | 3934346 | A1 * | 1/2022 | ........ H04W 72/046 |
| WO | 2020032659 | A1 | 2/2020 | |
| WO | 2020089457 | A1 | 5/2020 | |
| WO | 2020090093 | A1 | 5/2020 | |
| WO | 2020091570 | A1 | 5/2020 | |
| WO | 2020134359 | A1 | 7/2020 | |
| WO | 2020165308 | A1 | 8/2020 | |
| WO | 2021069646 | A1 | 4/2021 | |

OTHER PUBLICATIONS

ERICSSON: "Additional MTC Enhancements for LTE", RP-182593, Status Report to TSG, 3GPP TSG RAN Meeting #82, Sorrento, Italy, Dec. 10-13, 2018, pp. 1-15.

International Preliminary Report on Patentability—PCT/US2021/071043—The International Bureau of WIPO—Geneva, Switzerland—Feb. 9, 2023.

International Search Report and Written Opinion—PCT/US2021/071043—ISA/EPO—Jan. 18, 2022.

Partial International Search Report—PCT/US2021/071043—ISA/EPO—Nov. 24, 2021.

Qualcomm Incorporated: "Support for Transmission in Preconfigured UL Resources", 3GPP TSG RAN WG1 Meeting #98, 3GPP Draft, R1-1908835 PUR NB-IOT R1#98 Upload, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Aug. 26, 2019-Aug. 30, 2019, Aug. 17, 2019 (Aug. 17, 2019), pp. 1-7, XP051765443, Sections 2.1. 2.2 and 2.3, p. 2-p. 3.

Taiwan Search Report—TW110127866—TIPO—Nov. 9, 2024.

* cited by examiner

NESTING CONFIGURED GRANT—SMALL DATA TRANSFER OCCASIONS

CROSS-REFERENCE TO RELATED APPLICATION

This Patent Application is a continuation of U.S. Non-Provisional application Ser. No. 17/443,877 entitled "NESTING CONFIGURED GRANT-SMALL DATA TRANSFER OCCASIONS" and filed on Jul. 28, 2021, which claims priority to U.S. Provisional Patent Application No. 62/706,078, filed on Jul. 30, 2020, entitled "MULTIPLEXING PRECONFIGURED UPLINK RESOURCE OCCASIONS," and assigned to the assignee hereof. The disclosure of the prior Application is considered part of and is incorporated by reference in this Patent Application.

FIELD OF THE DISCLOSURE

Aspects of the present disclosure generally relate to wireless communication and to techniques and apparatuses for nesting configured grant-small data transfer occasions.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to an apparatus for wireless communication at a user equipment (UE). The apparatus may include a memory and one or more processors, coupled with the memory, configured to receive, from a base station, a configuration message that indicates a radio resource allocation and a transmission scheme for one or more first configured grant-small data transfer (CG-SDT) occasions and one or more second CG-SDT occasions, where the one or more second CG-SDT occasions are at least partially nested, in time, frequency, or a combination thereof, within the one or more first CG-SDT occasions; and transmit, to the base station, an uplink communication within the one or more first CG-SDT occasions or the one or more second CG-SDT occasions, using the radio resource allocation and the transmission scheme.

Some aspects described herein relate to an apparatus for wireless communication at a base station. The apparatus may include a memory and one or more processors, coupled with the memory, configured to transmit, to a UE, a configuration message that indicates a radio resource allocation and a transmission scheme for one or more first CG-SDT occasions and one or more second CG-SDT occasions, where the one or more second CG-SDT occasions are at least partially nested, in time, frequency, or a combination thereof, within the one or more first CG-SDT occasions; and receive, from the UE, an uplink communication within the one or more first CG-SDT occasions or the one or more second CG-SDT occasions, using the radio resource allocation and the transmission scheme.

Some aspects described herein relate to an apparatus for wireless communication at a UE. The apparatus may include a memory and one or more processors, coupled with the memory, configured to receive, from a base station, information indicating a radio resource allocation, a periodicity, a transmission scheme, and a resource size for a CG-SDT group including the UE; and receive, from the base station, an index that indicates one or more first CG-SDT occasions, where the index is based at least in part on one or more frequency resources included in the one or more first CG-SDT occasions, one or more time resources included in the one or more first CG-SDT occasions, and one or more demodulation reference signal (DMRS) resources associated with the one or more first CG-SDT occasions.

Some aspects described herein relate to an apparatus for wireless communication at a base station. The apparatus may include a memory and one or more processors, coupled with the memory, configured to transmit, to a UE, information indicating a radio resource allocation, a periodicity, a transmission scheme, and a resource size for a CG-SDT group including the UE; and transmit, to the UE, an index that indicates one or more first CG-SDT occasions, where the index is based at least in part on one or more frequency resources included in the one or more first CG-SDT occasions, one or more time resources included in the one or more first CG-SDT occasions, and one or more DMRS resources associated with the one or more first CG-SDT occasions.

Some aspects described herein relate to a method of wireless communication performed by a UE. The method may include receiving, from a base station, a configuration message that indicates a radio resource allocation and a transmission scheme for one or more first CG-SDT occasions and one or more second CG-SDT occasions, wherein the one or more second CG-SDT occasions are at least partially nested within the one or more first CG-SDT occasions. The method may further include transmitting, to the base station, an uplink communication within the one or more first CG-SDT occasions or the one or more second CG-SDT occasions, using the radio resource allocation and the transmission scheme.

Some aspects described herein relate to a method of wireless communication performed by a base station. The method may include transmitting, to a UE, a configuration message that indicates a radio resource allocation and a transmission scheme for one or more first CG-SDT occasions and one or more second CG-SDT occasions, wherein the one or more second CG-SDT occasions are at least partially nested within the one or more first CG-SDT occasions. The method may further include receiving, from the UE, an uplink communication within the one or more first CG-SDT occasions or the one or more second CG-SDT occasions, using the radio resource allocation and the transmission scheme.

Some aspects described herein relate to a method of wireless communication performed by a UE. The method may include receiving, from a base station, information indicating a radio resource allocation, a periodicity, a transmission scheme, and a resource size for a CG-SDT group including the UE. The method may further include receiving, from the base station, an index that indicates one or more first CG-SDT occasions, wherein the index is based at least in part on one or more frequency resources included in the one or more first CG-SDT occasions, one or more time resources included in the one or more first CG-SDT occasions, and one or more DMRS resources associated with the one or more first CG-SDT occasions.

Some aspects described herein relate to a method of wireless communication performed by a base station. The method may include transmitting, to a UE, information indicating a radio resource allocation, a periodicity, a transmission scheme, and a resource size for a CG-SDT group including the UE. The method may further include transmitting, to the UE, an index that indicates one or more first CG-SDT occasions, wherein the index is based at least in part on one or more frequency resources included in the one or more first CG-SDT occasions, one or more time resources included in the one or more first CG-SDT occasions, and one or more DMRS resources associated with the one or more first CG-SDT occasions.

Some aspects described herein relate to a non-transitory computer-readable medium that stores a set of instructions for wireless communication by a UE. The set of instructions, when executed by one or more processors of the UE, may cause the UE to receive, from a base station, a configuration message that indicates a radio resource allocation and a transmission scheme for one or more first CG-SDT occasions and one or more second CG-SDT occasions, wherein the one or more second CG-SDT occasions are at least partially nested within the one or more first CG-SDT occasions. The set of instructions, when executed by one or more processors of the UE, may further cause the UE to transmit, to the base station, an uplink communication within the one or more first CG-SDT occasions or the one or more second CG-SDT occasions, using the radio resource allocation and the transmission scheme.

Some aspects described herein relate to a non-transitory computer-readable medium that stores a set of instructions for wireless communication by a base station. The set of instructions, when executed by one or more processors of the base station, may cause the base station to transmit, to a UE, a configuration message that indicates a radio resource allocation and a transmission scheme for one or more first CG-SDT occasions and one or more second CG-SDT occasions, wherein the one or more second CG-SDT occasions are at least partially nested within the one or more first CG-SDT occasions. The set of instructions, when executed by one or more processors of the base station, may further cause the base station to receive, from the UE, an uplink communication within the one or more first CG-SDT occasions or the one or more second CG-SDT occasions, using the radio resource allocation and the transmission scheme.

Some aspects described herein relate to a non-transitory computer-readable medium that stores a set of instructions for wireless communication by a UE. The set of instructions, when executed by one or more processors of the UE, may cause the UE to receive, from a base station, information indicating a radio resource allocation, a periodicity, a transmission scheme, and a resource size for a CG-SDT group including the UE. The set of instructions, when executed by one or more processors of the UE, may further cause the UE to receive, from the base station, an index that indicates one or more first CG-SDT occasions, wherein the index is based at least in part on one or more frequency resources included in the one or more first CG-SDT occasions, one or more time resources included in the one or more first CG-SDT occasions, and one or more DMRS resources associated with the one or more first CG-SDT occasions.

Some aspects described herein relate to a non-transitory computer-readable medium that stores a set of instructions for wireless communication by a base station. The set of instructions, when executed by one or more processors of the base station, may cause the base station to transmit, to a UE, information indicating a radio resource allocation, a periodicity, a transmission scheme, and a resource size for a CG-SDT group including the UE. The set of instructions, when executed by one or more processors of the base station, may further cause the base station to transmit, to the UE, an index that indicates one or more first CG-SDT occasions, wherein the index is based at least in part on one or more frequency resources included in the one or more first CG-SDT occasions, one or more time resources included in the one or more first CG-SDT occasions, and one or more DMRS resources associated with the one or more first CG-SDT occasions.

Some aspects described herein relate to an apparatus for wireless communication. The apparatus may include means for receiving, from a base station, a configuration message that indicates a radio resource allocation and a transmission scheme for one or more first CG-SDT occasions and one or more second CG-SDT occasions, wherein the one or more second CG-SDT occasions are at least partially nested within the one or more first CG-SDT occasions. The apparatus may further include means for transmitting, to the base station, an uplink communication within the one or more first CG-SDT occasions or the one or more second CG-SDT occasions, using the radio resource allocation and the transmission scheme.

Some aspects described herein relate to an apparatus for wireless communication. The apparatus may include means for transmitting, to a UE, a configuration message that indicates a radio resource allocation and a transmission scheme for one or more first CG-SDT occasions and one or more second CG-SDT occasions, wherein the one or more second CG-SDT occasions are at least partially nested within the one or more first CG-SDT occasions. The apparatus may further include means for receiving, from the UE, an uplink communication within the one or more first CG-SDT occasions or the one or more second CG-SDT occasions, using the radio resource allocation and the transmission scheme.

Some aspects described herein relate to an apparatus for wireless communication. The apparatus may include means for receiving, from a base station, information indicating a radio resource allocation, a periodicity, a transmission scheme, and a resource size for a CG-SDT group including the apparatus. The apparatus may further include means for receiving, from the base station, an index that indicates one or more first CG-SDT occasions, wherein the index is based at least in part on one or more frequency resources included in the one or more first CG-SDT occasions, one or more time resources included in the one or more first CG-SDT occasions, and one or more DMRS resources associated with the one or more first CG-SDT occasions.

Some aspects described herein relate to an apparatus for wireless communication. The apparatus may include means for transmitting, to a UE, information indicating a radio resource allocation, a periodicity, a transmission scheme, and a resource size for a CG-SDT group including the UE. The apparatus may further include means for transmitting, to the UE, an index that indicates one or more first CG-SDT occasions, wherein the index is based at least in part on one or more frequency resources included in the one or more first CG-SDT occasions, one or more time resources included in the one or more first CG-SDT occasions, and one or more DMRS resources associated with the one or more first CG-SDT occasions.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
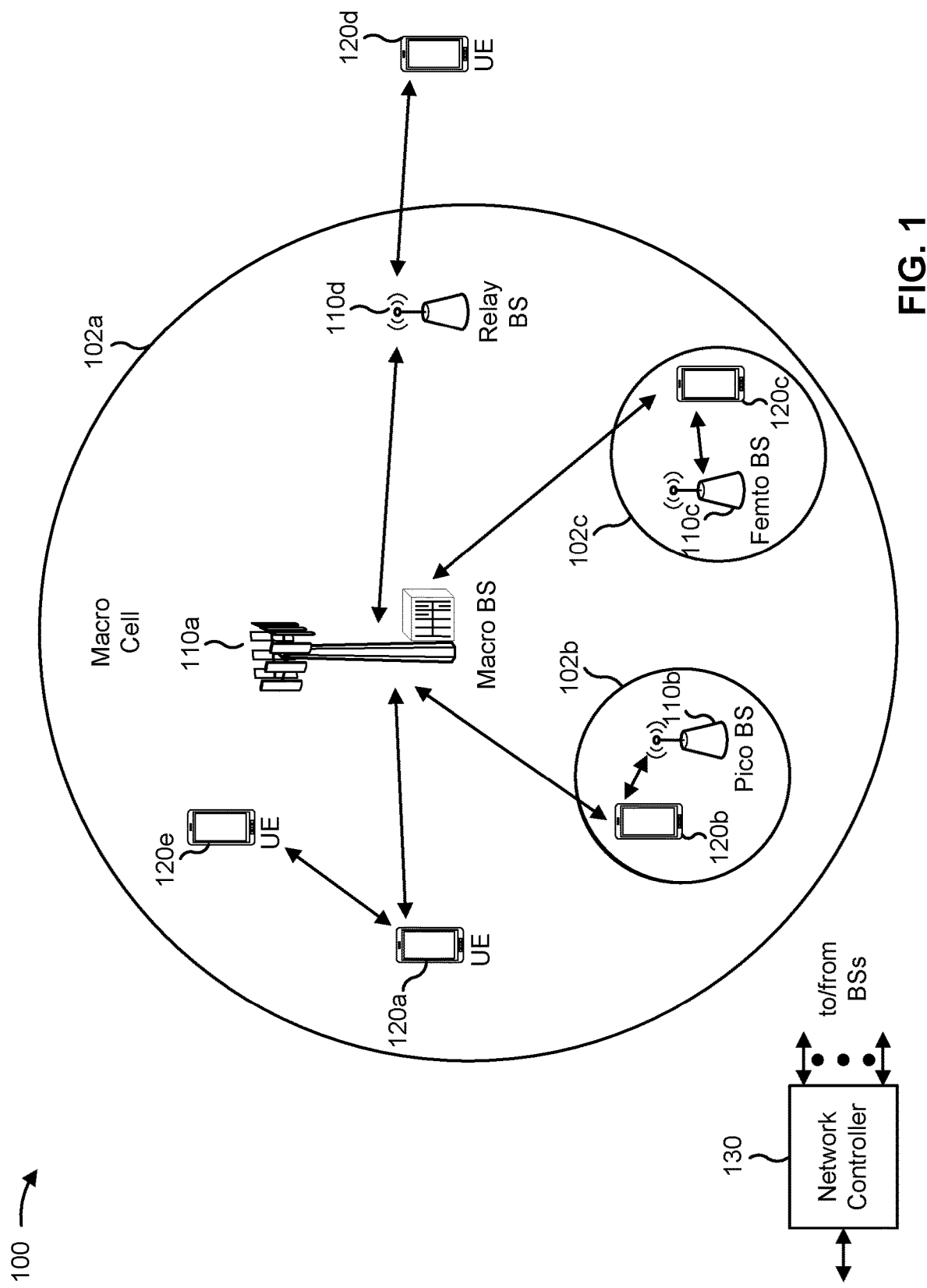
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IOT) devices, and/or may be implemented as NB-IOT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHZ) and FR2 (24.25 GHz-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHZ-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As indicated above, FIG. 1 is provided as an example. Other examples may differ from what is described with regard to FIG. 1.

Figure 2:
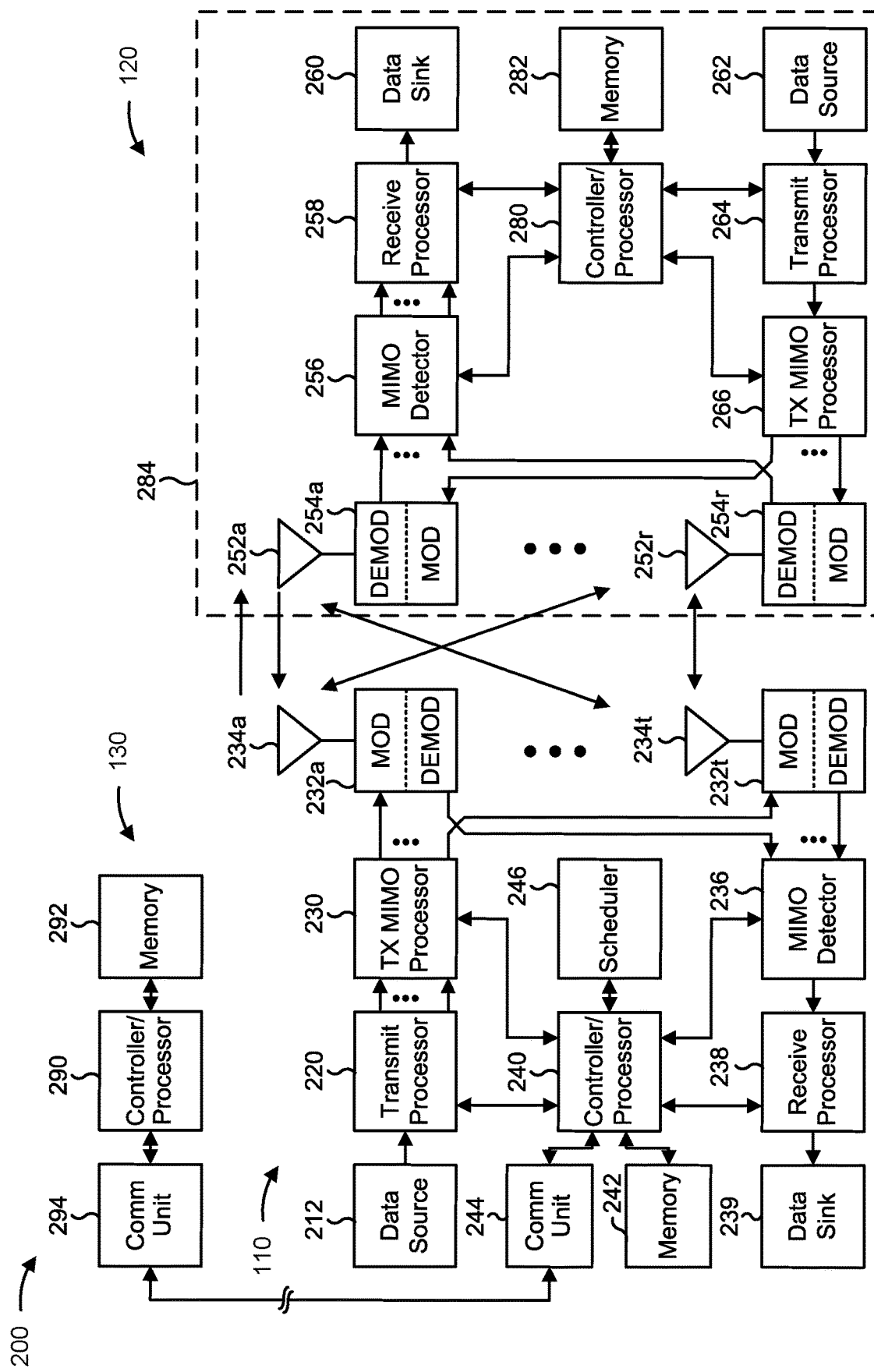
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4A, 4B, 4C and 5-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4A, 4B, 4C and 5-10).

The controller/processor 240 of the base station 110, the controller/processor 280 of the UE 120, and/or any other component(s) of FIG. 2 may perform one or more techniques associated with nesting configured grant-small data transfer (CG-SDT) occasions, as described in more detail elsewhere herein. For example, the controller/processor 240 of the base station 110, the controller/processor 280 of the UE 120, and/or any other component(s) of FIG. 2 may perform or direct operations of, for example, process 700 of FIG. 7, process 800 of FIG. 8, process 900 of FIG. 9, process 1000 of FIG. 10, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, a UE (e.g., the UE 120) may include means for receiving, from a base station (e.g., the base station 110), a configuration message that indicates a radio resource allocation and a transmission scheme for one or more first CG-SDT occasions and one or more second CG-SDT occasions, wherein the one or more second CG-SDT occasions are at least partially nested within the one or more first CG-SDT occasions; and/or means for transmitting, to the base station, an uplink communication within the one or more first CG-SDT occasions or the one or more second CG-SDT occasions, using the radio resource allocation and the transmission scheme. The means for the UE to perform operations described herein may include, for example, one or more of antenna 252, modem 254, MIMO detector 256, receive processor 258, transmit processor 264, TX MIMO processor 266, controller/processor 280, or memory 282.

In some aspects, a base station (e.g., the base station 110) may include means for transmitting, to a UE (e.g., the UE 120), a configuration message that indicates a radio resource allocation and a transmission scheme for one or more first CG-SDT occasions and one or more second CG-SDT occasions, wherein the one or more second CG-SDT occasions are at least partially nested within the one or more first CG-SDT occasions; and/or means for receiving, from the UE, an uplink communication within the one or more first CG-SDT occasions or the one or more second CG-SDT occasions, using the radio resource allocation and the transmission scheme. The means for the base station to perform operations described herein may include, for example, one or more of transmit processor 220, TX MIMO processor 230, modem 232, antenna 234, MIMO detector 236, receive processor 238, controller/processor 240, memory 242, or scheduler 246.

Nesting CG-SDT occasions allows for UEs to use the same time resources and/or frequency resources to transmit data to the base station such that the base station may allocate fewer time resources and/or frequency resources to the group of UEs. Accordingly, the base station and the group of UEs reduce network overhead and resource use by improving spectral efficiency of CG-SDT transmissions.

In some aspects, a UE (e.g., the UE 120) may include means for receiving, from a base station (e.g., the base station 110), information indicating a radio resource allocation, a periodicity, a transmission scheme, and a resource size for a CG-SDT group including the UE; and/or means for receiving, from the base station, an index that indicates one or more first CG-SDT occasions, wherein the index is based at least in part on one or more frequency resources included in the one or more first CG-SDT occasions, one or more time resources included in the one or more first CG-SDT occasions, and one or more DMRS resources associated with the one or more first CG-SDT occasions. The means for the UE to perform operations described herein may include, for example, one or more of antenna 252, modem 254, MIMO detector 256, receive processor 258, transmit processor 264, TX MIMO processor 266, controller/processor 280, or memory 282.

In some aspects, a base station (e.g., the base station 110) may include means for transmitting, to a UE (e.g., the UE 120), information indicating a radio resource allocation, a periodicity, a transmission scheme, and a resource size for a CG-SDT group including the UE; and/or means for transmitting, to the UE, an index that indicates one or more first CG-SDT occasions, wherein the index is based at least in part on one or more frequency resources included in the one or more first CG-SDT occasions, one or more time resources included in the one or more first CG-SDT occasions, and one or more DMRS resources associated with the one or more first CG-SDT occasions. The means for the base station to perform operations described herein may include, for example, one or more of transmit processor 220, TX MIMO processor 230, modem 232, antenna 234, MIMO detector 236, receive processor 238, controller/processor 240, memory 242, or scheduler 246.

Indexing CG-SDT occasions according to frequency resources, time resources, and/or DMRS resources allows the base station to use a single index to identify one of the CG-SGT occasions such that the base station may assign CG-SDT occasions to a group of UEs using smaller transmissions. Accordingly, the base station and the group of UEs reduce signaling overhead and conserve memory.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3A:
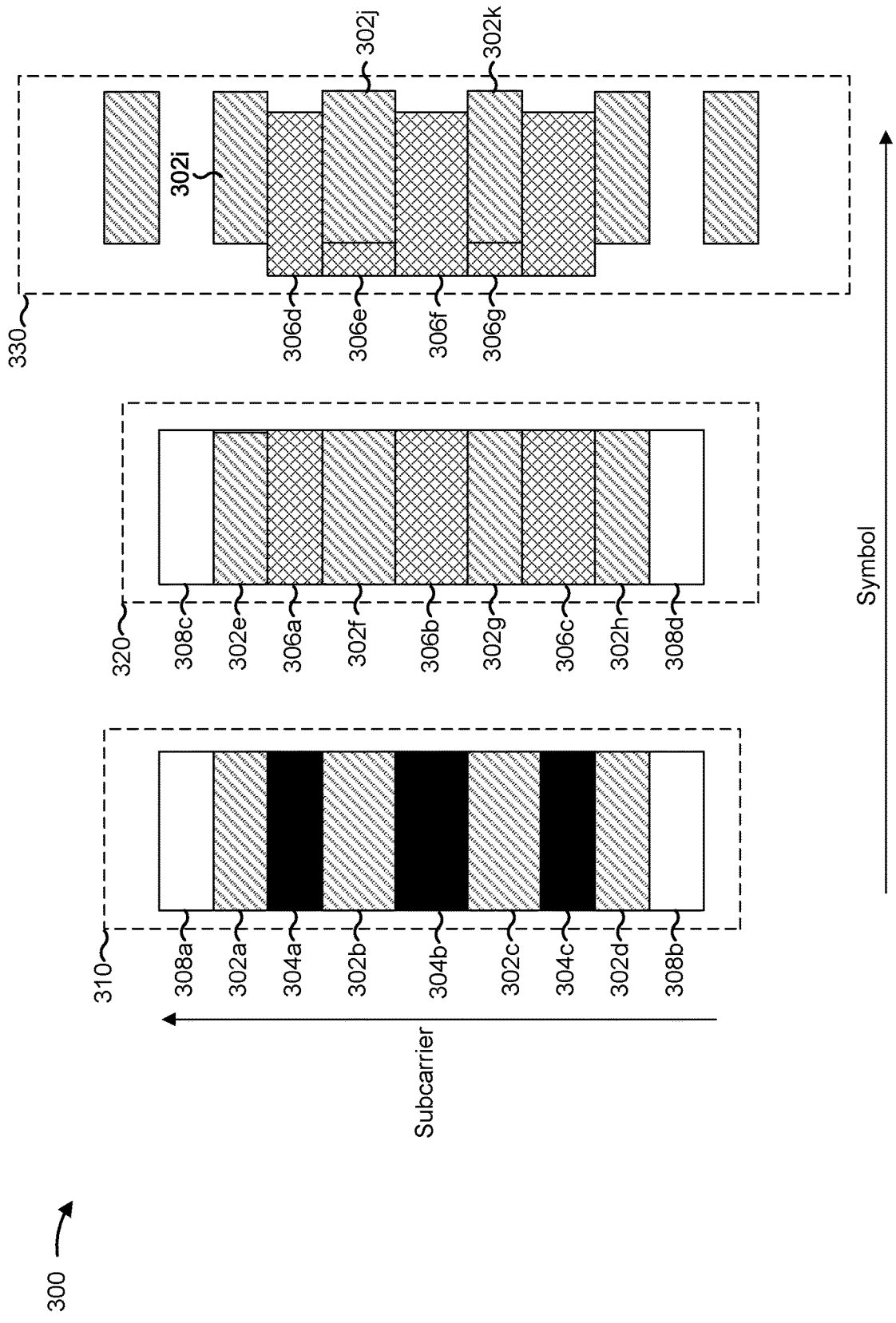
FIG. 3A is a diagram illustrating an example of multiplexing multiple uplink transmissions in various multiplexing modes, in accordance with the present disclosure.

FIG. 3A is a diagram illustrating an example 300 of multiplexing uplink transmissions using various multiplexing modes, in accordance with the present disclosure. For example, FIG. 3A shows various symbols for uplink transmissions from a UE (e.g., UE 120) and various ways in which the UE 120 may multiplex multiple uplink transmissions in the various symbols. The striped pattern boxes (e.g., 302a, 302b, 302c, 302d, 302e, 302f, 302g, 302h, 302i, 302j, and 302k) shown in FIG. 3A show resource elements that include data related to a sounding reference signal (SRS), and the black boxes (e.g., 304a, 304b, and 304c) shown in FIG. 3A show resource elements that include data related to a DMRS. Additionally, the cross-hatched boxes (e.g., 306a, 306b, 306c, 306d, 306e, 306f, and 306g) shown in FIG. 3A show resource elements that include data related to an uplink communication (e.g., a physical uplink shared channel (PUSCH) communication), and the white boxes 308a, 308b, 308c, and 308d shown in FIG. 3A show empty resource elements, resources elements that include other types of data, and/or other types of resource elements.

As shown by reference number 310, the UE 120 may multiplex an SRS with DMRS in a DMRS-related symbol (e.g., the SRS may be multiplexed with front-loaded DMRS). For example, the UE 120 may multiplex the SRS with the DMRS by using frequency domain multiplexing (FDM). In some aspects, using FDM may include transmitting an SRS and a DMRS on different sets of resource blocks and/or transmitting an SRS and a DMRS on different frequency combs of a same set of resource blocks (e.g., even tones for DMRS and odd tones for SRS, or even tones for SRS and odd tones for DMRS). Accordingly, the DMRS resource elements 304a, 304b, and 304c are separate from the SRS resource elements 302a, 302b, 302c, and 302d. In some aspects, the UE 120 may multiplex an SRS as described above when operating in a first multiplexing mode.

Additionally, or alternatively, and as shown by reference number 320, the UE 120 may multiplex an SRS with a PUSCH communication. For example, the UE 120 may multiplex the SRS with the PUSCH communication by using FDM. As described above, using FDM may include transmitting an SRS and a PUSCH communication on different sets of resource blocks and/or transmitting an SRS and a PUSCH communication on different frequency combs of a same set of resource blocks (e.g., even tones for PUSCH and odd tones for SRS, or even tones for SRS and odd tones for PUSCH). Accordingly, the PUSCH resource elements 306a, 306b, and 306c are separate from the SRS resource elements 302e, 302f, 302g, and 302h. In some aspects, the UE 120 may multiplex an SRS as described above when operating in a second multiplexing mode.

In some aspects, the UE 120 may rate-match the PUSCH communication around the resource elements (e.g., subcarriers as shown in FIG. 3A) that are occupied by the SRS. In one example of rate-matching, when an SRS occupies a subset of frequency tones on an OFDM symbol, such as frequency tone indexes 0, 4, 8, and so on within each resource block, then the UE 120 may map a PUSCH communication to other frequency tones of each resource block on the same OFDM symbol, such as to frequency tone indexes 1, 2, 3, 5, 6, 7, 9, 10, 11, and so on.

Additionally, or alternatively, and as shown by reference number 330, the UE 120 may multiplex an SRS by using spatial domain multiplexing (SDM). For example, SDM may allow multiple channels to overlap, and different communications to be transmitted on the same resource elements. In some aspects, the UE 120 may multiplex the SRS such that the SRS partially overlaps a symbol that includes a PUSCH communication, and the SRS and the PUSCH communication may use the same resource elements (e.g., subcarriers as shown in FIG. 3A). Accordingly, the PUSCH resource elements 306d and 306f are separate from the SRS resource elements (e.g., SRS resource element 302i), but the PUSCH resource elements 306e and 306g overlap SRS resource elements 302j and 302k. In some aspects, the UE 120 may multiplex an SRS as described above when operating in a third multiplexing mode.

As indicated above, FIG. 3A is provided as an example. Other examples are possible and may differ from what was described with respect to FIG. 3A.

Figure 3B:
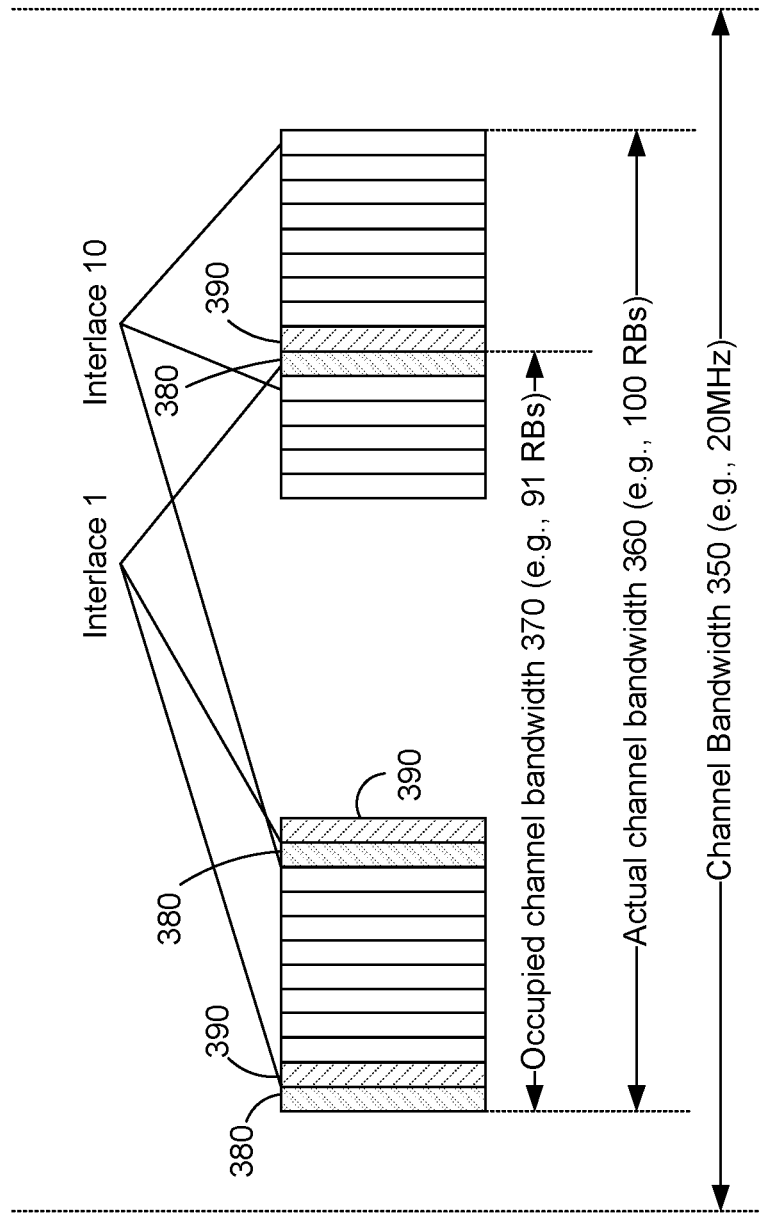
FIG. 3B is a diagram illustrating an example of an uplink transmission scheme, in accordance with the present disclosure.

FIG. 3B is a diagram illustrating an example 340 of an uplink transmission scheme, in accordance with the present disclosure. In some aspects, example 340 may be configured for multi-cluster SC-FDMA transmissions and/or the like. In example 340, channel bandwidth 350 is illustrated as 20 MHz (e.g., used for LTE unlicensed (LTE-U)). Although the description herein focuses on 20 MHz, the description similarly applies to other bandwidths. Generally, an actual channel bandwidth 360 may be a subset of the channel bandwidth 350. In example 340, actual channel bandwidth 360 is illustrated as 100 resource blocks (RBs), which may be approximately 18 MHz. Although the description herein focuses on 100 RBs, the description similarly applies to other resource block allocations.

In order to be considered occupied channel bandwidth, uplink transmissions should span at least 80% of channel bandwidth 350. Accordingly, in example 340, occupied channel bandwidth 370 is illustrated as 91 RBs, which may be approximately 16.4 MHz. Although the description herein focuses on 91 RBs, the description similarly applies to other resource block occupations. In some aspects, for uplink transmissions, such as PUSCH transmissions, 10 PUSCH channels may be multiplexed with a minimum interleaving granularity of 10 RBs in order to meet occupied bandwidth requirements. Although the description herein focuses on 10 PUSCH channels with a minimum interleaving granularity of 10 RBs, the description similarly applies to other quantities of PUSCH channels and/or other minimum interleaving granularities. In example 340, Interlace 1 through Interlace 10, including the interleaving of uplink transmission RBs 380 and 390 across occupied channel bandwidth 370, meets the occupied bandwidth requirements for unlicensed spectrum in LTE-U deployments.

In some aspects, uplink signals, such as physical uplink control channel (PUCCH) and/or PUSCH signals, among other examples, may be based on localized frequency division multiplexing (LFDM) waveforms that occupy a set of subcarriers. Accordingly, the UE 120 may transmit a different modulation symbol for each subcarrier and/or perform at least some precoding before sending the frequency domain waveform.

As indicated above, FIG. 3B is provided as an example. Other examples are possible and may differ from what was described with respect to FIG. 3B.

Some UEs may operate using fewer antennas (e.g., fewer Rx antennas) and/or reduced bandwidth (e.g., operating in a 5 MHz-20 MHz range rather than a 100 MHz bandwidth) in order to conserve battery power. Such UEs may include smart devices (such as smart watches and/or fitness trackers, among other examples), industrial sensors, and/or video surveillance devices, among other examples, and may be referred to as reduced capacity UEs ("RedCap UEs") or "NR-light UEs."

In order to conserve battery power of RedCap UEs, a base station may provide CG-SDT occasions in which a RedCap UE may communicate with the base station, even when the RedCap UE is in an idle mode or an inactive state. As used herein, a CG-SDT occasion may also be referred to as a preconfigured uplink resource (PUR) occasion. For example, 3GPP specifications for 5G may use the term CG-SDT while 3GPP specifications for LTE use the term PUR.

Existing 3GPP specifications and/or other standards for PUR configurations are limited. For example, 3GPP specifications do not allow for PUR occasions to be shared by more than two UEs. Additionally, 3GPP specifications require UEs that share PUR occasions use orthogonal DMRS with different cyclic shifts. Therefore, a base station may use significant amount of spectrum when configuring a plurality of UEs with PUR occasions.

Techniques and apparatuses described herein allow a base station (e.g., base station 110) to configure a group of UEs (e.g., including UE 120) for one or more CG-SDT occasions that are nested in time and/or frequency. A first CG-SDT occasion may be associated with a set of time resources and a set of frequency resources such that a second CG-SDT occasion may be "nested" within the first CG-SDT occasion by being associated with at least a subset of the set of time resources and/or at least a subset of the set of frequency resources. Nesting CG-SDT occasions allows for UEs to use the same time resources and/or frequency resources to transmit data to the base station 110 such that the base station 110 may allocate fewer time resources and/or frequency resources to the group of UEs. Accordingly, the base station 110 and the group of UEs reduce network overhead and resource use by improving spectral efficiency of CG-SDT transmissions. As a result, network congestion is reduced, which conserves power at the base station 110 and at the group of UEs by reducing failed receptions, failed decoding, and retransmissions.

Additionally, or alternatively, techniques and apparatuses described herein allow the base station 110 and the group of UEs to apply ordering rules to multiple CG-SDT occasions. Accordingly, the base station 110 reduces the signaling overhead used to configure the CG-SDT occasions, which conserves power and processing resources at the base station 110 and at the group of UEs. Additionally, as a result, network congestion is reduced, which conserves power at the base station 110 and at the group of UEs by reducing failed receptions, failed decoding, and retransmissions.

Figure 4A:
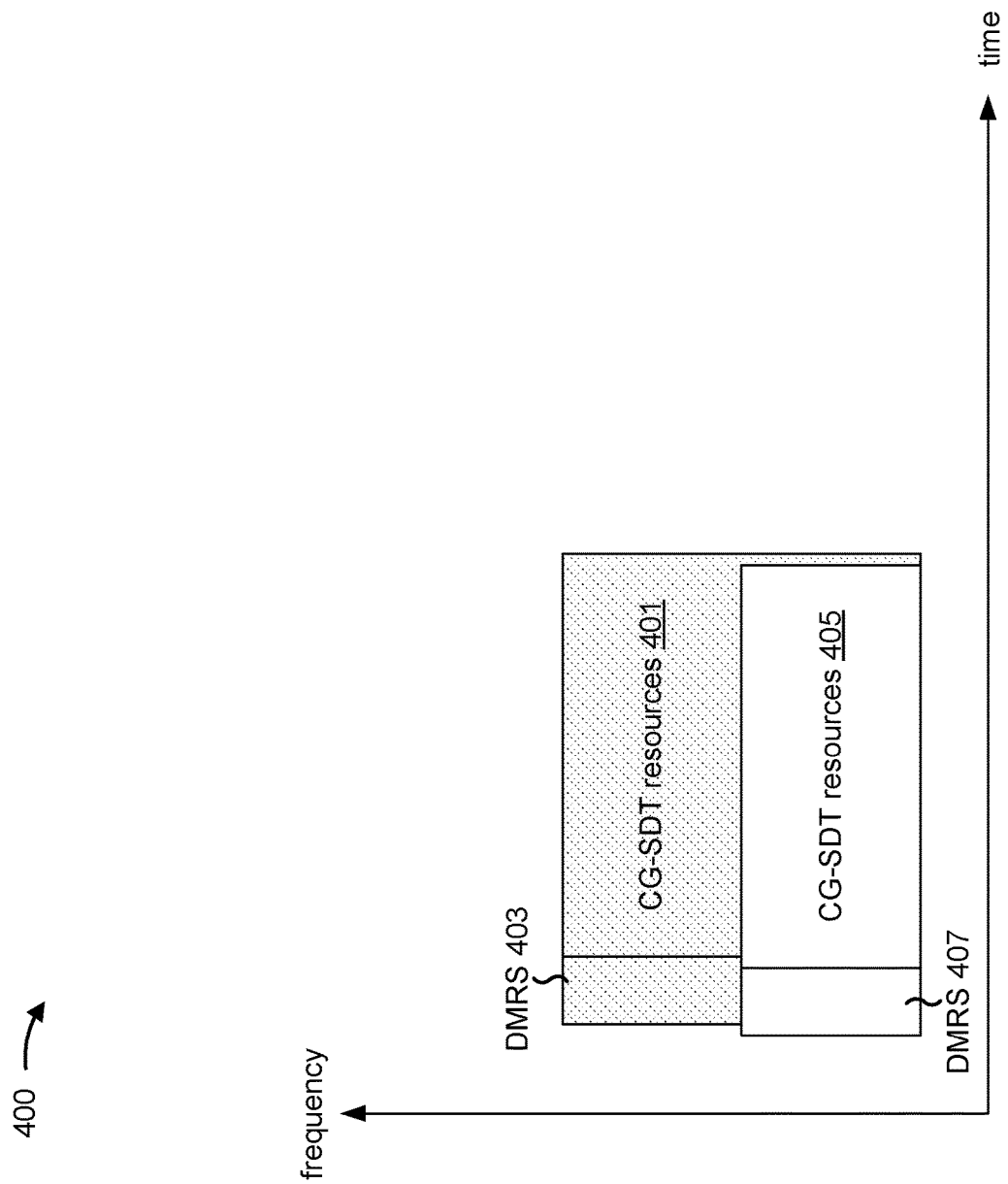
FIGS. 4A, 4B, and 4C are diagrams illustrating examples associated with nesting configured grant-small data transfer (CG-SDT) occasions, in accordance with the present disclosure.
Figure 4B:
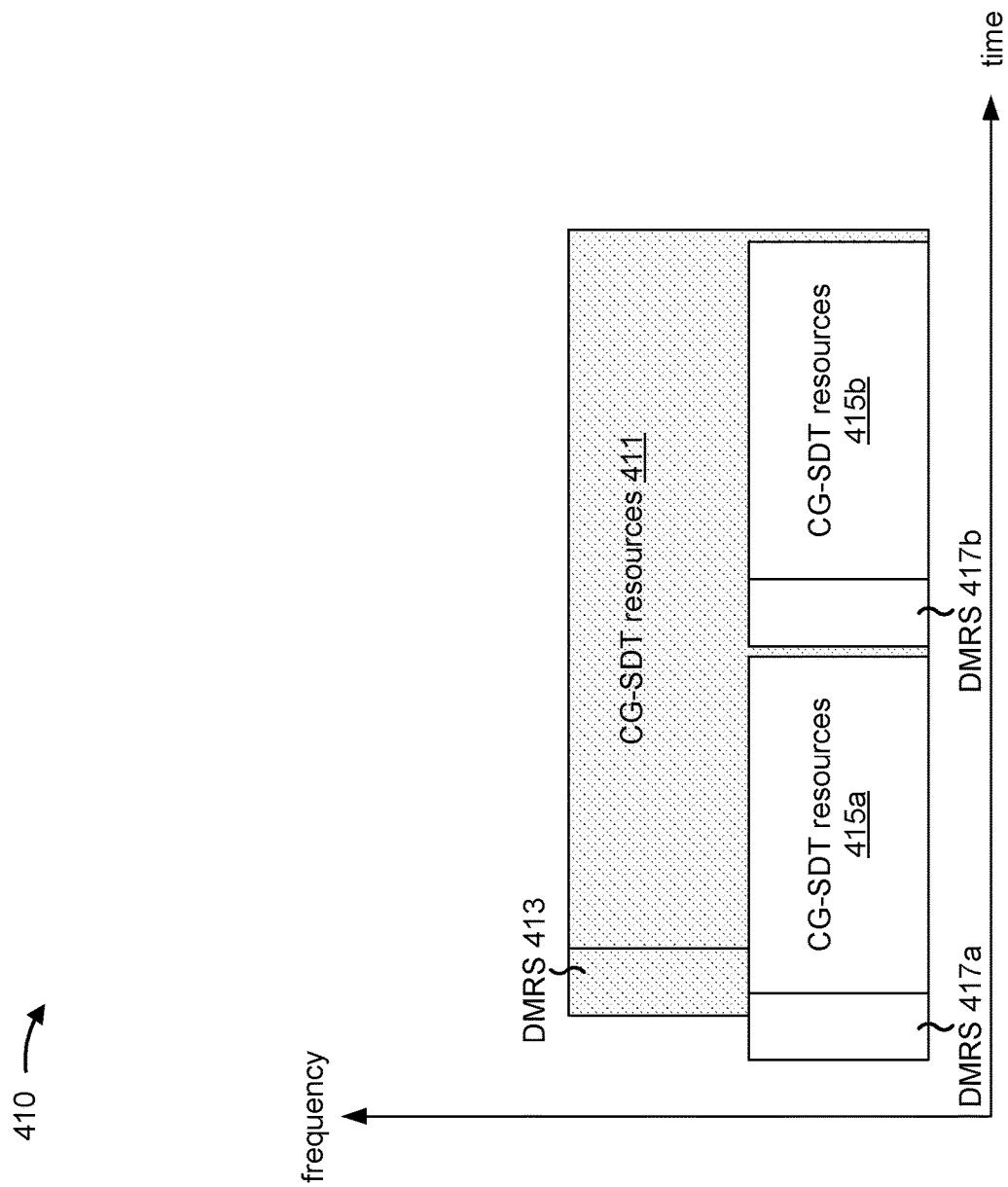
Figure 4C:
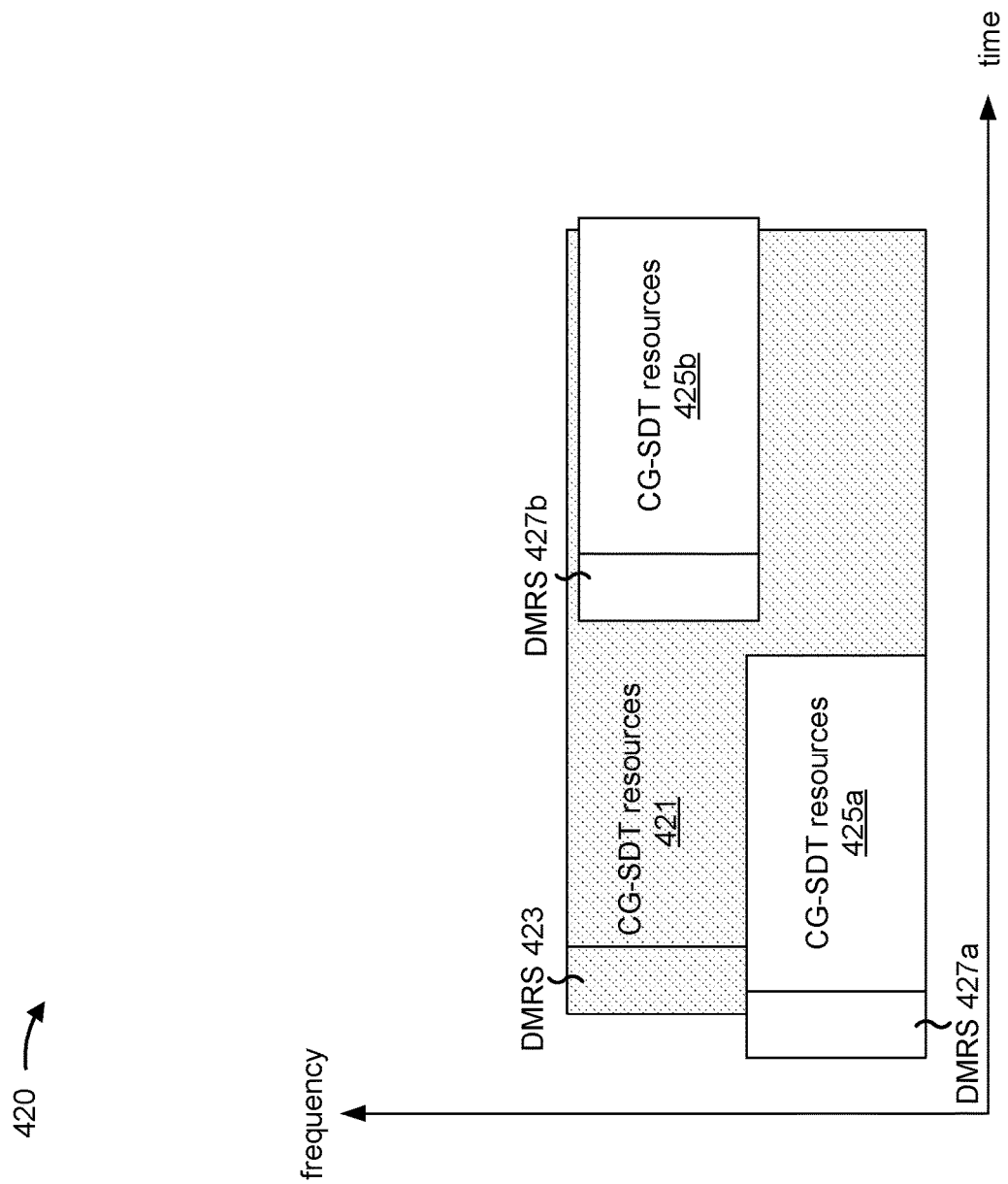

FIGS. 4A, 4B, and 4C are diagrams illustrating examples 400, 410, and 420, respectively, associated with nesting CG-SDT occasions, in accordance with the present disclosure. As shown in FIGS. 4A-4C, examples 400, 410, and 420 each include a first set of resources for CG-SDT occasions and a second set of resources for CG-SDT occasions. A group of UEs (e.g., including UE 120 and one or more other UEs) may use the CG-SDT occasions for uplink transmissions to a base station (e.g., base station 110). For example, the uplink transmissions may include PUSCH transmissions. The group of UEs may share CG-SDT occasions and be differentiated by corresponding DMRS port indices associated with corresponding ones of the UEs. In some aspects, the base station 110 and the group of UEs may be included in a wireless network, such as wireless network 100.

In examples 400, 410, and 420, the base station 110 may transmit, and the UE 120 may receive, a configuration message indicating one or more first CG-SDT occasions and one or more second CG-SDT occasions. As shown in FIG. 4A, the CG-SDT resources 405 for the second CG-SDT occasion(s) are at least partially nested within the CG-SDT resources 401 for the first CG-SDT occasion(s). A start of the CG-SDT resources 405 are not offset in time from a start of the CG-SDT resources 401 but are depicted with a stereoscopic offset to show the nesting.

The first CG-SDT occasion(s) may be associated with a set of time resources and a set of frequency resources such that the second CG-SDT occasion(s) may be "partially nested" within the first CG-SDT occasion(s) by being associated time resources that include at least a subset of the set of time resources and/or frequency resources that include at least a subset of the set of frequency resources. Accordingly, the CG-SDT resources 405 are nested within the CG-SDT resources 401 in frequency because the CG-SDT resources 405 include a subset of the frequency resources that are included in the CG-SDT resources 401. In some aspects, the CG-SDT resource 405 may additionally include one or more frequency resources not included in the CG-SDT resources 405 and still be partially nested. Similarly, the CG-SDT resources 405 are nested within the CG-SDT resources 401 in time because the CG-SDT resources 405 include the time resources that are included in the CG-SDT resources 401. In some aspects, the CG-SDT resource 405 may additionally include one or more time resources not included in the CG-SDT resources 405 and still be partially nested.

Similarly, as shown in FIG. 4B, the CG-SDT resources 415a and 415b for the second CG-SDT occasion(s) are at least partially nested within the CG-SDT resources 411 for the first CG-SDT occasion(s). Similarly, as shown in FIG. 4C, the CG-SDT resources 425a and 425b for the second CG-SDT occasion(s) are at least partially nested within the CG-SDT resources 421 for the first CG-SDT occasion(s).

Accordingly, the UE 120 may transmit, and the base station 110 may receive, an uplink communication (e.g., a PUSCH transmission) within the first CG-SDT occasion(s) or the second CG-SDT occasion(s). For example, the base station 110 may configure the UE 120 to use either the first CG-SDT occasion(s) or the second CG-SDT occasion(s). Accordingly, the base station 110 may distinguish first uplink communications in the first CG-SDT occasion(s) from second uplink communications in the second CG-SDT occasion(s) based at least in part on different DMRS resources (e.g., associated with different antenna port indices and/or different DMRS indices) associated with the first uplink communications as compared with the second uplink communications.

In some aspects, the first CG-SDT occasion(s) and the second CG-SDT occasion(s) may be associated with a same CG-SDT group including the UE 120. For example, the base station 110 may configure the group of UEs together, assigning at least some of the group of UEs the first CG-SDT occasion(s) and others of the group of UEs the second CG-SDT occasion(s). By assigning the group of UEs together, the base station 110 reduces signaling overhead because the base station 110 may broadcast or multi-cast the assignment rather than assigning CG-SDT occasions to individual UEs.

In some aspects, as shown in FIGS. 4A-4C, the second CG-SDT occasion(s) may be associated with a resource size that is different than a resource size associated with the first CG-SDT occasion(s). In example 400, the CG-SDT resources 405 for the second CG-SDT occasion(s) include 6 RBs, and the CG-SDT resources 401 for the first CG-SDT occasion(s) include 12 RBs. Similarly, in example 410, the CG-SDT resources 415a and 415b for the second CG-SDT occasion(s) include 6 RBs, and the CG-SDT resources 411 for the first CG-SDT occasion(s) include 12 RBs. Similarly, in example 420, the CG-SDT resources 425a and 425b for the second CG-SDT occasion(s) include 6 RBs, and the CG-SDT resources 421 for the first CG-SDT occasion(s) include 12 RBs. Other examples may include larger second CG-SDT occasions (e.g., 7 RBs, 8 RBs, 9 RBs, and so on) or smaller second CG-SDT occasions (e.g., 1 RB, 2 RBs, 3 RBs, 4 RBs, or 5 RBs). Additionally, or alternatively, other examples include larger first CG-SDT occasions (e.g., 14 RBs, 15 RBs, 16 RBs, and so on) or smaller first CG-SDT occasions (e.g., 1 RB, 2 RBs, 3 RBs, and so on). By assigning some UEs within the group to the first CG-SDT occasion(s) and others of the group of UEs to the second CG-SDT occasion, the base station 110 can assign smaller CG-SDT resources (e.g., the CG-SDT resources 405, 415a and 415b, or 425a and 425b) to UEs that are expected to have smaller uplink communications, and larger CG-SDT resources (e.g., the CG-SDT resources 401, 411, or 421, respectively) to UEs that are expected to have larger uplink communications. Accordingly, the base station 110 reduces latency for the UEs that are expected to have larger uplink communications while conserving network spectrum assigned to the UEs that are expected to have smaller uplink communications.

To avoid interference, the base station 110 may configure the first CG-SDT occasion(s) and the second CG-SDT occasion(s) with orthogonal (or at least quasi-orthogonal) multiplexing in one or more dimensions. For example, as described below, the base station 110 may associate first DMRS resources with the first CG-SDT occasion(s) that are orthogonal to second DMRS resources associated with the second CG-SDT occasion(s). In another example, as described below, the base station 110 may associate a first beam with the first CG-SDT occasion(s) that is orthogonal to a second beam associated with the second CG-SDT occasion(s). As shown in examples 400, 410, and 420, the one or more second CG-SDT occasions are at least partially nested in time within the first CG-SDT occasion(s). Accordingly, as further shown in examples 400, 410, and 420, the DMRS resources associated with the second CG-SDT occasion(s) (e.g., DMRS resource 407 in example 400, DMRS resources 417a and 417b in example 410, and DMRS resources 427a and 427b in example 420) may be orthogonal (or at least quasi-orthogonal) with the DMRS resources associated with the first CG-SDT occasion(s) (e.g., DMRS resource 403 in example 400, DMRS resource 413 in example 410, and DMRS resource 423 in example 420). For example, the DMRS resources 417a and 417b may be associated with different cyclic shifts, different beams, and/or other different physical properties such that the DMRS resources 417a and 417b are orthogonal even though DMRS resources 417a and 417b overlap in time and frequency in example 400. Additionally, or alternatively, the one or more first CG-SDT occasions may occupy different frequencies than those which the one or more second CG-SDT occasions occupy. Accordingly, the second CG-SDT occasion(s) may be at least partially nested in time with the first CG-SDT occasion(s) but orthogonal in frequency.

As further shown in examples 400, 410, and 420, the one or more second CG-SDT occasions are at least partially nested in frequency within the first CG-SDT occasion(s). Accordingly, as further shown in examples 400, 410, and 420, the DMRS resources associated with the second CG-SDT occasion(s) (e.g., DMRS resource 407 in example 400, DMRS resources 417a and 417b in example 410, and DMRS resources 427a and 427b in example 420) may be orthogonal (or at least quasi-orthogonal) with the DMRS resources associated with the first CG-SDT occasion(s) (e.g., DMRS resource 403 in example 400, DMRS resource 413 in example 410, and DMRS resource 423 in example 420). Additionally, or alternatively, the one or more first CG-SDT occasions may occupy different portions of a time domain than those which the one or more second CG-SDT occasions occupy. Accordingly, the second CG-SDT occasion(s) may be at least partially nested in frequency with the first CG-SDT occasion(s) but orthogonal in time.

Other examples may differ from what is shown in examples 400, 410, and 420. For example, the one or more second CG-SDT occasions may additionally or alternatively be at least partially nested in space within the first CG-SDT occasion(s). For example, the second CG-SDT occasion(s) may be associated with one or more beams that are included within a set of beams associated with the first CG-SDT occasion(s). Accordingly, the DMRS resources associated with the second CG-SDT occasion(s) (e.g., DMRS resource 407 in example 400, DMRS resources 417a and 417b in example 410, and DMRS resources 427a and 427b in example 420) may be at least partially shared with the DMRS resources associated with the first CG-SDT occasion(s) (e.g., DMRS resource 403 in example 400, DMRS resource 413 in example 410, and DMRS resource 423 in example 420). Furthermore, to avoid interference, the one or more first CG-SDT occasions may occupy different frequencies and/or different portions of a time domain than those which the one or more second CG-SDT occasions occupy. For example, the second CG-SDT occasion(s) may be at least partially nested in time with the first CG-SDT occasion(s) but separate in frequency to reduce interference. As an alternative, the second CG-SDT occasion(s) may be at least partially nested in frequency with the first CG-SDT occasion(s) but separate in time to reduce interference.

As further shown in example 410 of FIG. 4B, the base station 110 may indicate one or more mappings or repetition schemes in a time domain for a PUSCH in which the UE 120 transmits uplink communications. Additionally, or alternatively, the base station 110 may indicate an MCS and/or a frequency hopping for a PUSCH in which the UE 120 transmits uplink communications. Example 420 of FIG. 4C depicts an example of frequency hopping for the second CG-SDT occasion(s). Additionally, or alternatively, the first CG-SDT occasion(s) may include frequency hopping. For example, the first CG-SDT occasion(s) in example 400 may include an additional set of CG-SDT resources that are separate in time from, and shifted in frequency as compared with, the CG-SDT resources 401. Accordingly, the CG-SDT resources for the second CG-SDT occasion(s) may be nested within only the CG-SDT resources 401, only the additional set of CG-SDT resources, or both.

As described in further detail in connection with FIG. 6, the base station 110 may assign CG-SDT occasions using an index. For example, the index may identify different sets of CG-SDT occasions that have the same resource size but are located in different portions of a frequency domain, a time domain, and/or a spatial domain. In some aspects, the index may be based at least in part on one or more frequency resources included in one or more CG-SDT occasions (e.g., indicated by one or more frequency resource indices, where each index may be represented by $f_{id}$), one or more time resources included in the CG-SDT occasion(s) (e.g., indicated by one or more time resource indices, where each index may be represented by $t_{id}$), and one or more DMRS resources associated with the CG-SDT occasion(s) (e.g., indicated by one or more DMRS resource indices, where each index may be represented by $DMRS_{id}$). Accordingly, the index may be sequential based at least in part on an increasing order of the frequency resource(s), an increasing order of the time resource(s), and an increasing order of the DMRS resource(s). For example, the index may increase sequentially as the different sets of CG-SDT occasions increase in frequency (but not in time or DMRS), then may further increase sequentially as the different sets of CG-SDT occasions increase in DMRS (but not in time), and finally increase sequentially as the different sets of CG-SDT occasions increase in time. Other examples may modify the order of sequential increasing (e.g., time first, frequency second, and DMRS third; time first, DMRS second, and frequency third; frequency first, time second, and DMRS third; DMRS first, time second, and frequency third; and/or DMRS first, frequency second, and time third). In one example, a first CG-SDT occasion may be associated with a frequency resource index of 0 (e.g., $f_{id}=0$), a DMRS resource index of 0 (e.g., $DMRS_{id}=0$), and a time resource index of 1 (e.g., $t_{id}=1$). Similarly, a second CG-SDT occasion may be associated with a frequency resource index of 1 (e.g., $f_{id}=1$), a DMRS resource index of 1 (e.g., $DMRS_{id}=1$), and a time resource index of 1 (e.g., $t_{id}=1$), and a third CG-SDT occasion may be associated with a frequency resource index of 1 (e.g., $f_{id}=1$), a DMRS resource index of 0 (e.g., $DMRS_{id}=0$), and a time resource index of 1 (e.g., $t_{id}=1$). A fourth CG-SDT occasion may be associated with a frequency resource index of 1 (e.g., $f_{id}=1$), a DMRS resource index of 1 (e.g., $DMRS_{id}=1$), and a time resource index of 0 (e.g., $t_{id}=0$). Accordingly, a CG-SDT index may be assigned as follows: The first index (e.g., zero) to the first CG-SDT occasion because the frequency resource index is zero and remaining CG-SDT occasions are associated with frequency resource indices of one; the second index (e.g., one) to the third CG-SDT occasion because the DMRS resource index is zero and remaining CG-SDT occasions are associated with DMRS resource indices of one; the third index (e.g., two) to the fourth CG-SDT occasion because the time resource index is zero and the remaining CG-SDT occasion is associated with a time resource index of one; and the last index (e.g., three) to the second CG-SDT occasion that remains.

The index may be sequential based at least in part on one or more rules stored by the base station 110 (e.g., programmed into and/or otherwise preconfigured for the base station 110) and/or the UE 120 (e.g., programmed into and/or otherwise preconfigured for the UE 120). For example, the stored rules may be based on 3GPP specifications and/or another standard. Additionally, or alternatively, the index may be sequential based at least in part on one or more rules indicated, to the UE 120, by the base station 110. For example, the base station 110 may radio resource control (RRC) configure the UE 120 to select amongst a plurality of stored rules. As an alternative, the base station 110 may RRC configure the UE 120 for the rules without using stored rules.

By using nesting as described in connection with FIGS. 4A-4C, the base station 110 and the UE 120 improve spectral efficiency of CG-SDT transmissions. The base station 110 may assign a group of UEs, together, to different CG-SDT occasions that are nested in order to reduce signaling overhead because the base station 110 may broadcast or multi-cast the assignment rather than assigning CG-SDT occasions to individual UEs. Accordingly, the base station 110 and the UE 120 reduce network overhead and resource consumption. Additionally, in some aspects, the base station 110 may assign some UEs within the group to smaller CG-SDT resources (e.g., to UEs expected to have smaller uplink communications) and other UEs to larger CG-SDT resources (e.g., to UEs that are expected to have larger uplink communications) in order to reduce latency for UEs expected to have larger uplink communications while conserving network spectrum allocated to UEs expected to have smaller uplink communications.

Additionally, or alternatively, by using indexing as described in connection with FIGS. 4A-4C, the base station 110 and the UE 120 reduce signaling overhead used to configure CG-SDT occasions. The base station 110 may use a single index (e.g., based at least in part on the frequency resource indices, the time resources indices, and/or the DMRS resource indices) to identify a CG-SDT occasion such that the base station 110 transmits less information when assigning the CG-SDT occasion to the UE 120. Accordingly, the base station 110 and the UE 120 reduce network overhead and resource consumption.

As indicated above, FIGS. 4A-4C are provided as examples. Other examples may differ from what is described with respect to FIGS. 4A-4C.

Figure 5:
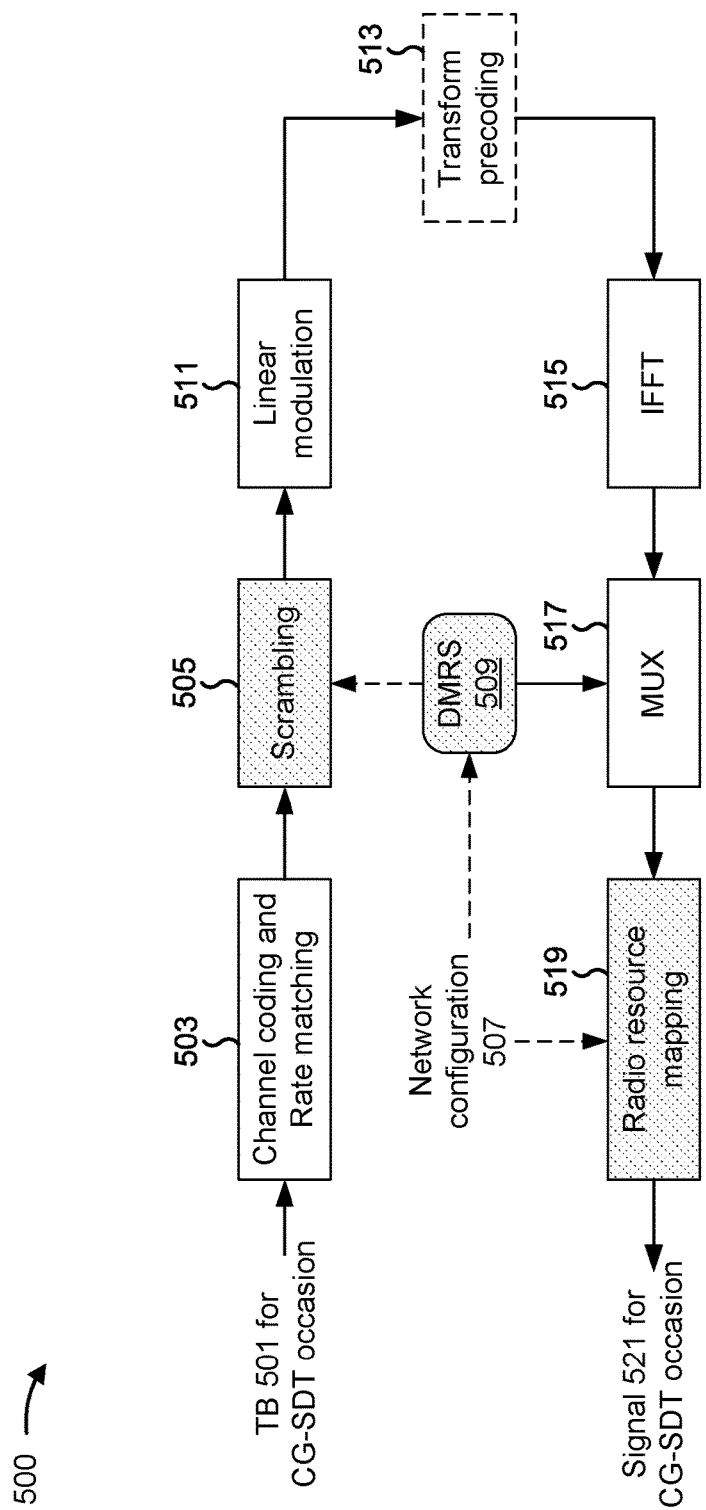
FIG. 5 is a diagram illustrating an example associated with a transmit chain for uplink transmissions, in accordance with the present disclosure.

FIG. 5 is a diagram illustrating an example 500 associated with a transmit chain for uplink transmissions, in accordance with the present disclosure. As shown in FIG. 5, example 500 shows a process for a UE (e.g., UE 120) to send an uplink transmission (e.g., a PUSCH communication). For example, the UE 120 may send the uplink transmission to a base station (e.g., base station 110). In some aspects, the UE 120 may send the uplink transmission in a CG-SDT occasion (e.g., configured by base station 110 as described in connection with FIGS. 4A-4C). In some aspects, the base station 110 and the UE 120 may be included in a wireless network, such as wireless network 100.

As shown in FIG. 5, the UE 120 may schedule a transport block (TB) 501 within the CG-SDT occasion for the uplink transmission. The UE 120 may code the TB 501 according to a channel used for the CG-SDT occasion (block 503). In some aspects, the UE 120 may additionally rate-match the TB 501 (block 503) (e.g., to avoid interference on the channel).

As further shown in FIG. 5, the UE 120 may scramble an identifier of the uplink transmission (block 505). Scrambling the identifier allows the base station 110 to separate the uplink transmission sent by the UE 120 from other signals received from other UEs. In some aspects, the UE 120 may scramble the identifier of the uplink transmission based at least in part on an index associated with the CG-SDT occasion that is selected by the UE 120 for the uplink transmission. Using the CG-SDT index allows the base station 110 to separate uplink transmissions associated with one CG-SDT occasion from uplink transmissions associated with another CG-SDT occasion (e.g., a nested or partially nested CG-SDT occasion). In some aspects, the index may include or otherwise be based at least in part on an index as described in connection with FIGS. 4A-4C. Additionally, or alternatively, as further shown in FIG. 5, the UE 120 may scramble the identifier of the uplink transmission based at least in part on an index associated with a DMRS 509 that is associated with the CG-SDT occasion. Using the DMRS index allows the base station 110 to separate an uplink transmission from one UE in an CG-SDT group from another uplink transmission from another UE in the same CG-SDT group. Additionally, or alternatively, the UE 120 may scramble the identifier of the uplink transmission based at least in part on an identifier of a cell in which the UE 120 is transmitting, an identifier of the UE 120, and/or another identifier.

As further shown in FIG. 5, the UE 120 may perform linear modulation (block 511), transform precoding (block 513), and/or inverse fast Fourier transform (IFFT) (block 515) on the uplink transmission including the scrambled identifier. Additionally with, or alternatively to, scrambling the identifier of the uplink transmission with an index associated with the DMRS 509, the UE 120 may multiplex (MUX) the DMRS 509 with the IFFT'd uplink transmission (block 517).

As further shown in FIG. 5, the UE 120 may map the multiplexed uplink transmission to one or more radio resources for transmission in the CG-SDT occasion (block 519). The mapping and the DMRS 509, as shown by reference number 507 in FIG. 5, may have been configured by the base station 110 (e.g., using RRC signaling). For example, the base station 110 may configure the mapping and the DMRS 509 when configuring the CG-SDT occasion. Accordingly, the UE 120 may produce a signal 521, encoding the uplink transmission, for transmission in the CG-SDT occasion.

By using a transmit chain as described in connection with FIG. 5, the UE 120 may associate uplink transmissions with indices of CG-SDT occasions selected by the UE 120 for the uplink transmissions. Accordingly, the UE 120 may use the index described in connection with FIGS. 4A-4C, which allows the base station 110 to distinguish uplink transmissions from the UE 120 from other signals without having to transmit additional information (e.g., a temporary identifier, such as an RNTI) to the UE 120. Additionally, or alternatively, the UE 120 may associate uplink transmissions with indices of DMRSs configured by the base station 110 for the uplink transmissions. Accordingly, the UE 120 may use the DMRS index to allow the base station 110 to distinguish uplink transmissions from the UE 120 from other signals without having to transmit additional information (e.g., a temporary identifier, such as an RNTI) to the UE 120.

As indicated above, FIG. 5 is provided as an example. Other examples may differ from what is described with respect to FIG. 5.

Figure 6:
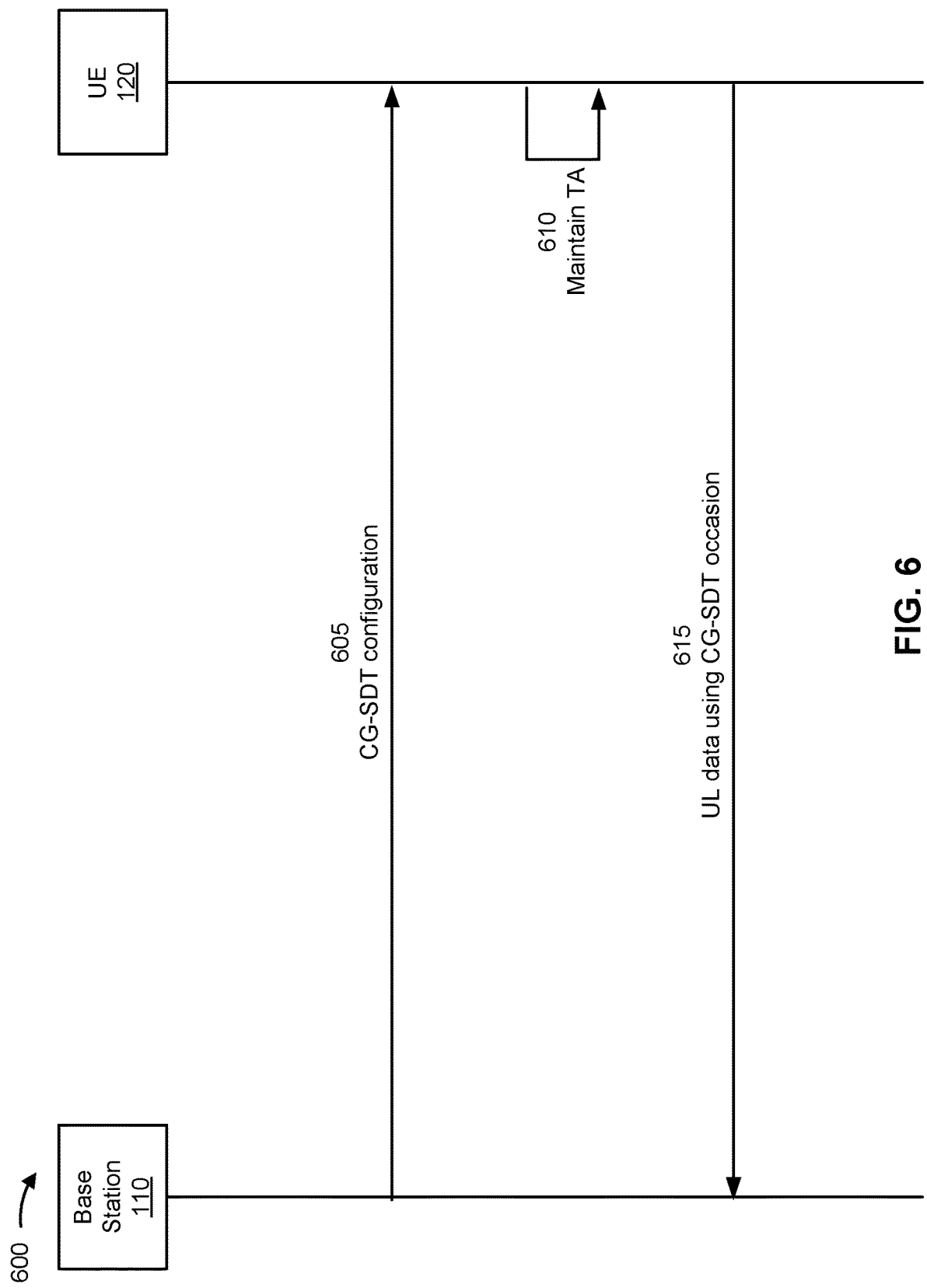
FIG. 6 is a diagram illustrating an example associated with using CG-SDT occasions for uplink transmissions, in accordance with the present disclosure.

FIG. 6 is a diagram illustrating an example 600 associated with using CG-SDT occasions for uplink transmissions, in accordance with the present disclosure. As shown in FIG. 6, example 600 includes communication between a base station 110 and a UE 120. In some aspects, the base station 110 and the UE 120 may be included in a wireless network, such as wireless network 100. The base station 110 and the UE 120 may communicate on a wireless access link, which may include an uplink and a downlink. The UE 120 may the UE be in an inactive mode, an idle state, or a connected mode, while executing operations described in connection with FIG. 6.

As shown in connection with reference number 605, the base station 110 may transmit, and the UE 120 may receive a configuration message that indicates a radio resource allocation and a transmission scheme for one or more first CG-SDT occasions and one or more second CG-SDT occasions. For example, the configuration message may include an RRC message. In some aspects, the configuration message may be a dedicated message or a group-common message. For example, the configuration message may be addressed to a radio network temporary identifier (RNTI) associated with the UE 120, or to a group RNTI (G-RNTI), and/or a plurality of RNTIs. In some aspects, the one or more second CG-SDT occasions may be at least partially nested within the first CG-SDT occasion(s).

In some aspects, the configuration message may further indicate one or more search space configurations for a response message (e.g., as described in connection with reference number 615), one or more uplink control information (UCI) multiplexing schemes, one or more timing advance (TA) validation schemes (e.g., as described in connection with reference number 610), one or more power control schemes for initial transmission, and/or one or more power control schemes for retransmission (e.g., when UE 120 has to retransmit an uplink communication, as described in connection with reference number 615). For example, the configuration message may provide one or more parameters for the UE 120 to apply to a formula (e.g., as defined in 3GPP specifications and/or another standard) to determine power control. In some aspects, the power control for retransmissions may be the same as, or different than, power control for initial transmission.

In some aspects, the first CG-SDT occasion(s) and the second CG-SDT occasion(s) may be associated with a same CG-SDT group including the UE 120. Accordingly, at least a portion of the configuration message may be broadcast to all UEs within the CG-SDT group. For example, the configuration message may include multiple indicators of CG-SDT occasions and associate the indicators with identifiers of different UE in the CG-SDT group. Additionally, or alternatively, at least a portion of the configuration message may be unicast to each UE within the CG-SDT group. For example, one configuration message may indicate the first CG-SDT occasion(s) for one or more first UEs in the CG-SDT group, the second CG-SDT occasion(s) for one or more second UEs in the CG-SDT group, and so on.

In some aspects, and as described in connection with FIGS. 4A-4C, the one or more second CG-SDT occasions may be associated with a resource size that is different than a resource size associated with the first CG-SDT occasion(s). For example, the one or more second CG-SDT occasions may be smaller or larger in resource size than the first CG-SDT occasion(s).

Additionally, or alternatively, and as described in connection with FIGS. 4A-4C, the one or more second CG-SDT occasions may be at least partially nested in time, frequency, and/or space within the first CG-SDT occasion(s). Accordingly, the as described in connection with FIGS. 4A-4C, the second CG-SDT occasion(s) and the first CG-SDT occasion(s) may be orthogonal (or at least quasi-orthogonal) in a time dimension, a frequency dimension, and/or associated DMRS resources.

In some aspects, the configuration message may further indicate one or more mappings or repetition schemes in a time domain for a PUSCH in which the UE 120 transmits an uplink communication (e.g., as described in connection with reference number 615). For example, as described in connection with FIG. 4B, the one or more second CG-SDT occasions may repeat in the time domain as well as being at least partially nested within the first CG-SDT occasion(s). Additionally, or alternatively, the one or more first CG-SDT occasions may repeat in the time domain. By using a mapping or a repetition scheme in a time domain, the base station 110 allows the UE 120 to transmit larger uplink communications across repetitions of CG-SDT occasions. Additionally, or alternatively, the base station 110 allows the UE 120 to repeat an uplink communication across repetitions of CG-SDT occasions to improve quality and/or reliability of the uplink communication.

In some aspects, the one or more second CG-SDT occasions may be associated with an MCS that is different than an MCS associated with the first CG-SDT occasion(s) as well as being at least partially nested within the first CG-SDT occasion(s). For example, the base station 110 may associate the second CG-SDT occasion(s) with a higher or lower MCS than an MCS associated with the first CG-SDT occasion(s).

Additionally with the configuration message, or alternatively to the configuration message, the base station 110 may transmit, and the UE 120 may receive, information indicating a radio resource allocation, a periodicity, a transmission scheme, and a resource size for a CG-SDT group including the UE 120. Additionally, the base station 110 may further transmit, and the UE 120 may further receive, an index that indicates the first CG-SDT occasion(s). For example, as described in connection with FIGS. 4A-4C, the index may be based at least in part on one or more frequency resources included in the first CG-SDT occasion(s), one or more time resources included in the first CG-SDT occasion(s), and one or more DMRS resources associated with the first CG-SDT occasion(s).

As described in connection with FIGS. 4A-4C, the index may be sequential based at least in part on an increasing order of the frequency resource(s), an increasing order of the DMRS resource(s), and an increasing order of the time resource(s). In some aspects, and as further described in connection with FIGS. 4A-4C, the index may be sequential based at least in part on one or more rules stored by the UE 120 and/or one or more rules indicated by the base station 110.

In some aspects, the information may further indicate an MCS, a frequency hopping, and a mapping or repetition scheme in a time domain for the CG-SDT group. For example, as described in connection with FIG. 4C, the one or more second CG-SDT occasions may provide for frequency hopping. Additionally, or alternatively, as described in connection with FIG. 4B, the one or more second CG-SDT occasions may repeat in a time domain.

In some aspects, the base station 110 may transmit, and the UE 120 may receive, the information and the index in a broadcast message. For example, the information may include multiple indices for CG-SDT occasions and associate the indices with identifiers of different UE in the CG-SDT group. Additionally, or alternatively, the base station 110 may transmit, and the UE 120 may receive, the information and the index in a UE-specific message. For example, the base station 110 may transmit information and an index associated with the first CG-SDT occasion(s) to a first UE in the CG-SDT group, transmit separate information and an index associated with the second CG-SDT occasion(s) to a second UE in the CG-SDT group, and so on. In some aspects, the base station 110 may provide the information in a broadcast message followed by the index in a UE-specific message.

As shown in connection with reference number 610, the UE 120 may maintain a TA with the base station 110. In some aspects, the UE 120 may maintain the TA even if the UE 120 enters an idle mode and/or an inactive state. For example, the UE 120 may maintain the TA when the UE 120 is stationary or at least partially stationary (e.g., exhibiting mobility that satisfies a threshold).

In some aspects, the UE 120 may validate uplink TA before transmitting the uplink communication, as described in connection with reference number 615. In some aspects, the UE 120 may validate the uplink TA based at least in part on one or more criteria provided by the base station 110. For example, as described above in connection with reference number 605, the base station 110 may have transmitted, and the UE 120 may have received, a TA validation scheme. For example, the TA validation scheme may include a timer-based scheme (e.g., a TA is valid for an amount of time after synchronization) and/or a measurement-based scheme (e.g., a TA is valid as long as one or more measurements of one or more reference signals continue to satisfy one or more thresholds). In some aspects, the UE 120 may measure a reference signal (e.g., a synchronization signal block (SSB), a channel state information reference signal (CSI-RS), and/or another signal, to validate the uplink TA. For example, the UE 120 may apply the one or more criteria from the base station 110 to the measurements to validate the TA before transmitting uplink communications within the first CG-SDT occasion(s) or the second CG-SDT occasion(s).

As shown in connection with reference number 615, the UE 120 may transmit, and the base station 110 may receive, an uplink communication within the first CG-SDT occasion(s) or the second CG-SDT occasion(s), using the radio resource allocation and the transmission scheme for the selected CG-SDT occasion(s). For example, the uplink communication may comprise a PUSCH transmission. In some aspects, the UE 120 may determine whether to transmit in the first CG-SDT occasion(s) or the second CG-SDT occasion(s) based on whether the base station 110 configured the UE 120 for the first CG-SDT occasion(s) or the second CG-SDT occasion(s). For example, as described above, the base station 110 may provide an index, separately to the UE 120 and/or associated with an identifier of the UE 120, such that the UE 120 may determine whether to use the first CG-SDT occasion(s) or the second CG-SDT occasion(s) based at least in part on the index.

In some aspects, and as described in connection with FIG. 5, the uplink communication may include an identifier based at least in part on an index associated with the first CG-SDT occasion(s) or the second CG-SDT occasion(s) that are selected by the UE 120 for a PUSCH transmission.

In some aspects, the base station 110 may transmit, and the UE 120 may receive, in a search space indicated by the configuration message, a response based at least in part on the uplink communication. In some aspects, the uplink communication may be associated with an initial transmission or a retransmission. For example, the base station 110 may transmit, and the UE 120 may receive, a physical downlink control channel (PDCCH) message in response to the uplink communication.

By using techniques as described in connection with FIG. 6, the base station 110 and the UE 120 improve spectral efficiency of CG-SDT transmissions. Accordingly, the base station 110 and the UE 120 reduce network overhead and resource consumption. Additionally, or alternatively, by using indexing described in connection with reference number 605, the base station 110 and the UE 120 reduce signaling overhead used to configure CG-SDT occasions. Accordingly, the base station 110 and the UE 120 reduce network overhead and resource consumption.

As indicated above, FIG. 6 is provided as an example. Other examples may differ from what is described with respect to FIG. 6.

Figure 7:
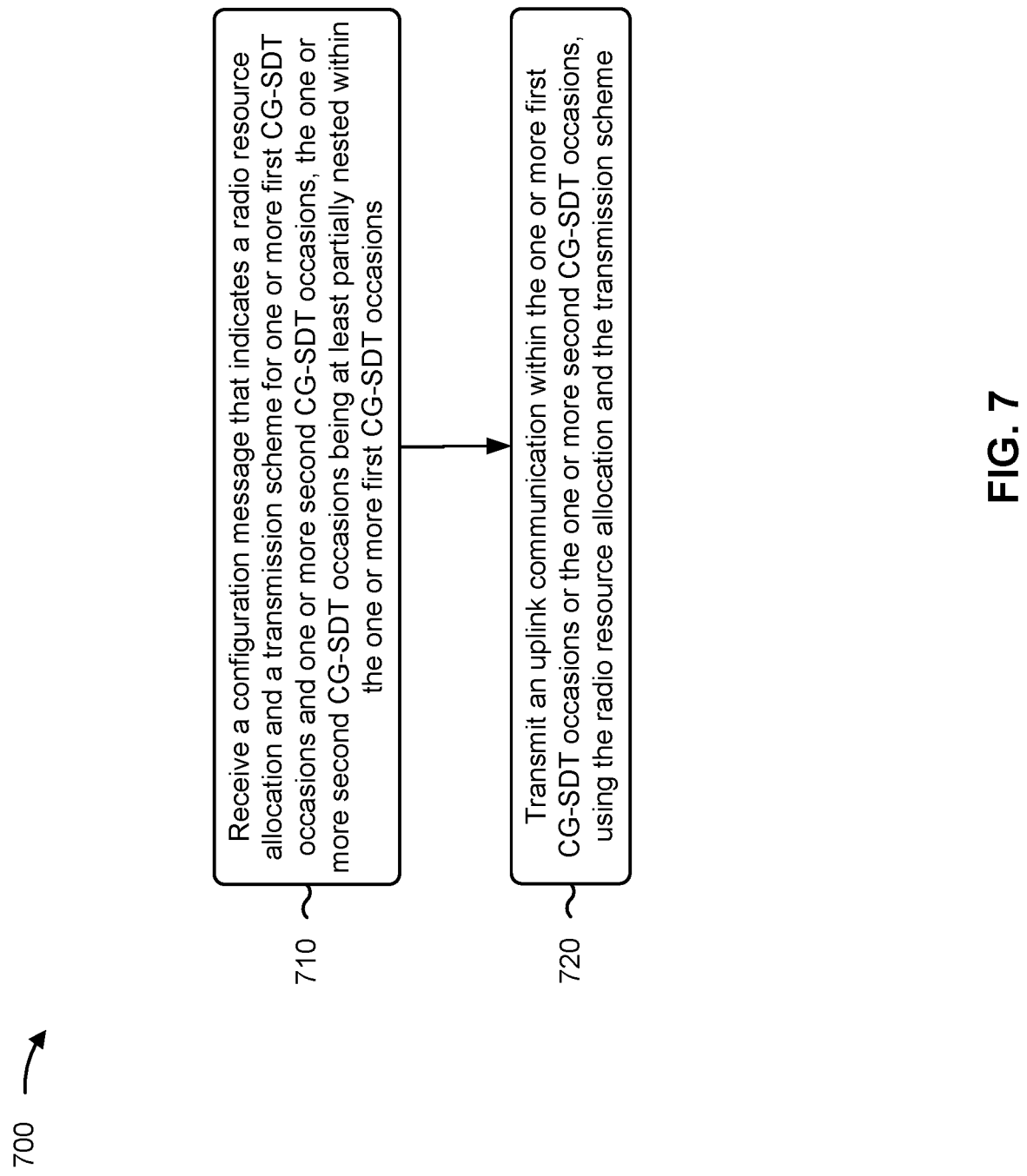
FIGS. 7 and 8 are diagrams illustrating example processes associated with nesting CG-SDT occasions, in accordance with the present disclosure.

FIG. 7 is a diagram illustrating an example process 700 performed, for example, by a UE, in accordance with the present disclosure. Example process 700 is an example where the UE (e.g., UE 120) performs operations associated with nesting CG-SDT occasions.

As shown in FIG. 7, in some aspects, process 700 may include receiving, from a base station (e.g., base station 110), a configuration message that indicates a radio resource allocation and a transmission scheme for one or more first CG-SDT occasions and one or more second CG-SDT occasions (block 710). For example, the UE (e.g., using antenna 252, modem 254, MIMO detector 256, receive processor 258, controller/processor 280, and/or memory 282) may receive, from a base station, a configuration message that indicates a radio resource allocation and a transmission scheme for one or more first CG-SDT occasions and one or more second CG-SDT occasions, as described herein. In some aspects, the one or more second CG-SDT occasions are at least partially nested, in time, frequency, or a combination thereof, within the one or more first CG-SDT occasions.

As further shown in FIG. 7, in some aspects, process 700 may include transmitting, to the base station, an uplink communication within the one or more first CG-SDT occasions or the one or more second CG-SDT occasions, using the radio resource allocation and the transmission scheme (block 720). For example, the UE (e.g., using antenna 252, transmit processor 264, TX MIMO processor 266, modem 254, controller/processor 280, and/or memory 282) may transmit, to the base station, an uplink communication within the one or more first CG-SDT occasions or the one or more second CG-SDT occasions, using the radio resource allocation and the transmission scheme, as described herein.

Process 700 may include additional aspects, such as any single aspect or any combination of aspects described below and/or in connection with one or more other processes described elsewhere herein.

In a first aspect, the one or more first CG-SDT occasions and the one or more second CG-SDT occasions are associated with a same CG-SDT group including the UE. This has a technical effect of reducing signaling overhead from the base station 110 by allowing the base station 110 to broadcast or multi-cast at least part of the configuration message.

In a second aspect, alone or in combination with the first aspect, the one or more second CG-SDT occasions are associated with a resource size that is different than a resource size associated with the one or more first CG-SDT occasions. This has a technical effect of allowing the base station 110 to assign some UEs to smaller CG-SDT resources (e.g., to UEs expected to have smaller uplink communications) and other UEs to larger CG-SDT resources (e.g., to UEs that are expected to have larger uplink communications) in order to reduce latency for UEs expected to have larger uplink communications while conserving network spectrum allocated to UEs expected to have smaller uplink communications.

In a third aspect, alone or in combination with one or more of the first and second aspects, the configuration message indicates frequency hopping for the one or more first CG-SDT occasions or the one or more second CG-SDT occasions. This has a technical effect of allowing for a larger uplink communication using frequency hopping. Additionally, or alternatively, this has a technical effect of increasing reliability and/or quality of the uplink communication by allowing repetition of the uplink communication in different frequencies.

In a fourth aspect, alone or in combination with one or more of the first through third aspects, the one or more second CG-SDT occasions are associated with an MCS that is different than an MCS associated with the one or more first CG-SDT occasions. This has a technical effect of allowing the base station 110 to assign some UEs to CG-SDT occasions with a higher MCS (e.g., to UEs that are closer and/or associated with better radio conditions) and other UEs to CG-SDT occasions with lower MCS (e.g., to UEs that are farther and/or associated with worse radio conditions) in order to increase throughput for UEs associated with strong radio signals while increasing quality and/or reliability for UEs associated with weak radio signals.

In a fifth aspect, alone or in combination with one or more of the first through fourth aspects, the configuration message indicates one or more mappings or repetition schemes in a time domain for a PUSCH used to transmit the uplink communication. This has a technical effect of allowing the UE 120 to transmit a larger uplink communication across the time domain. Additionally, or alternatively, this has a technical effect of allowing the UE 120 to increase reliability and/or quality by repeating the uplink communication across the time domain.

In a sixth aspect, alone or in combination with one or more of the first through fifth aspects, process 700 further includes receiving (e.g., using antenna 252, modem 254, MIMO detector 256, receive processor 258, controller/processor 280, and/or memory 282), from the base station and in a search space indicated by the configuration message, a response based at least in part on the uplink communication, where the uplink communication is associated with an initial transmission or a retransmission. This has a technical effect of allowing the UE 120 to determine whether to retransmit the uplink communication to the base station 110. Accordingly, the UE 120 ensures that the base station 110 receives the uplink communication and then conserves power and processing resources once the uplink communication has been received.

In a seventh aspect, alone or in combination with one or more of the first through sixth aspects, the uplink communication includes an identifier based at least in part on an index associated with the one or more first CG-SDT occasions or the one or more second CG-SDT occasions that are selected by the UE for a DMRS and PUSCH transmission. This has a technical effect of allowing the UE 120 to scramble the uplink communication such that the base station 110 can distinguish the uplink communication from other signals. Additionally, the UE 120 may scramble the uplink communication without receiving another identifier from the base station 110 to use for the scrambling, which conserves power, processing resources, and network overhead.

In an eighth aspect, alone or in combination with one or more of the first through seventh aspects, the configuration message further indicates at least one of one or more search space configurations for a response message, one or more UCI multiplexing schemes, one or more TA validation schemes, one or more power control schemes for initial transmission, or one or more power control schemes for retransmission.

In a ninth aspect, alone or in combination with one or more of the first through eighth aspects, process 700 further includes validating (e.g., using transmit processor 264, TX MIMO processor 266, modem 254, controller/processor 280, and/or memory 282) uplink TA, based at least in part on one or more criteria provided by the base station, before transmitting the uplink communication, such that the uplink communication is transmitted based at least in part on validating the uplink TA. This has a technical effect of increasing reliability and/or quality of the uplink communication by ensuring that the UE 120 does not transmit the uplink communication according to a TA that is inaccurate.

In a tenth aspect, alone or in combination with one or more of the first through ninth aspects, the UE is in an inactive mode, an idle state, or a connected mode.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
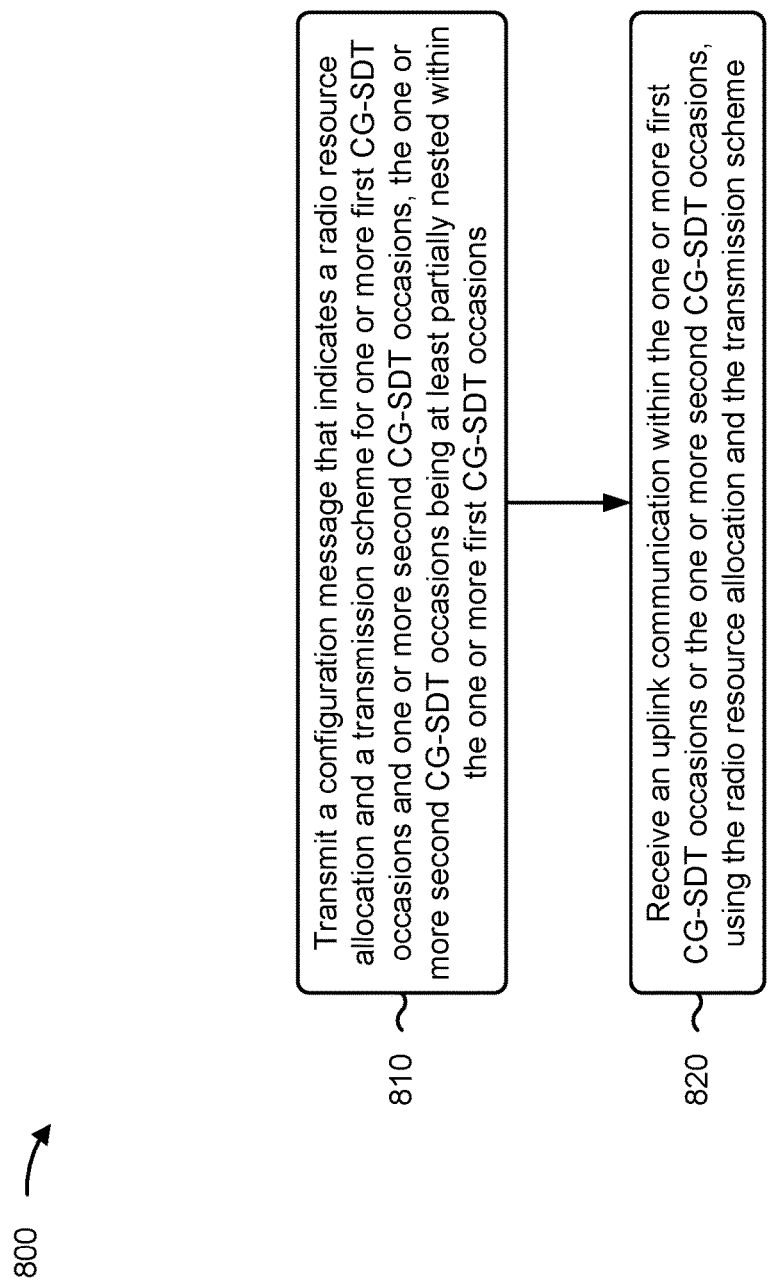

FIG. 8 is a diagram illustrating an example process 800 performed, for example, by a base station, in accordance with the present disclosure. Example process 800 is an example where the base station (e.g., base station 110) performs operations associated with nesting CG-SDT occasions.

As shown in FIG. 8, in some aspects, process 800 may include transmitting, to a UE (e.g., UE 120), a configuration message that indicates a radio resource allocation and a transmission scheme for one or more first CG-SDT occasions and one or more second CG-SDT occasions (block 810). For example, the base station (e.g., using transmit processor 220, TX MIMO processor 230, modem 232, antenna 234, controller/processor 240, memory 242, and/or scheduler 246) may transmit, to a UE, a configuration message that indicates a radio resource allocation and a transmission scheme for one or more first CG-SDT occasions and one or more second CG-SDT occasions, as described herein. In some aspects, the one or more second CG-SDT occasions are at least partially nested, in time, frequency, or a combination thereof, within the one or more first CG-SDT occasions.

As further shown in FIG. 8, in some aspects, process 800 may include receiving, from the UE, an uplink communication within the one or more first CG-SDT occasions or the one or more second CG-SDT occasions, using the radio resource allocation and the transmission scheme (block 820). For example, the base station (e.g., using antenna 234, modem 232, MIMO detector 236, receive processor 238, controller/processor 240, and/or memory 242) may receive, from the UE, an uplink communication within the one or more first CG-SDT occasions or the one or more second CG-SDT occasions, using the radio resource allocation and the transmission scheme, as described herein.

Process 800 may include additional aspects, such as any single aspect or any combination of aspects described below and/or in connection with one or more other processes described elsewhere herein.

In a first aspect, the one or more first CG-SDT occasions and the one or more second CG-SDT occasions are associated with a same CG-SDT group including the UE.

In a second aspect, alone or in combination with the first aspect, the one or more second CG-SDT occasions are associated with a resource size that is different than a resource size associated with the one or more first CG-SDT occasions.

In a third aspect, alone or in combination with one or more of the first and second aspects, the one or more second CG-SDT occasions are associated with an MCS that is different than an MCS associated with the one or more first CG-SDT occasions.

In a fourth aspect, alone or in combination with one or more of the first through third aspects, the configuration message indicates frequency hopping for the one or more first CG-SDT occasions or the one or more second CG-SDT occasions.

In a fifth aspect, alone or in combination with one or more of the first through fourth aspects, the configuration message indicates one or more mappings or repetition schemes in a time domain for a PUSCH used to receive the uplink communication.

In a sixth aspect, alone or in combination with one or more of the first through fifth aspects, process 800 further includes transmitting (e.g., using transmit processor 220, TX MIMO processor 230, modem 232, antenna 234, controller/processor 240, memory 242, and/or scheduler 246), to the UE and in a search space indicated by the configuration message, a response based at least in part on the uplink communication, where the uplink communication is associated with an initial transmission or a retransmission.

In a seventh aspect, alone or in combination with one or more of the first through sixth aspects, the uplink communication includes an identifier based at least in part on an index associated with the one or more first CG-SDT occasions or the one or more second CG-SDT occasions that were selected by the UE for a DMRS and PUSCH transmission.

In an eighth aspect, alone or in combination with one or more of the first through seventh aspects, the configuration message further indicates at least one of one or more search space configurations for a response message, one or more UCI multiplexing schemes, one or more TA validation schemes, one or more power control schemes for initial transmission, or one or more power control schemes for retransmission.

In a ninth aspect, alone or in combination with one or more of the first through eighth aspects, process 800 further includes transmitting (e.g., using transmit processor 220, TX MIMO processor 230, modem 232, antenna 234, controller/processor 240, memory 242, and/or scheduler 246), to the UE, one or more criteria for validating uplink TA, such that the uplink communication is received based at least in part on a validation of the uplink TA.

In a tenth aspect, alone or in combination with one or more of the first through ninth aspects, the UE is in an inactive mode, an idle state, or a connected mode.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
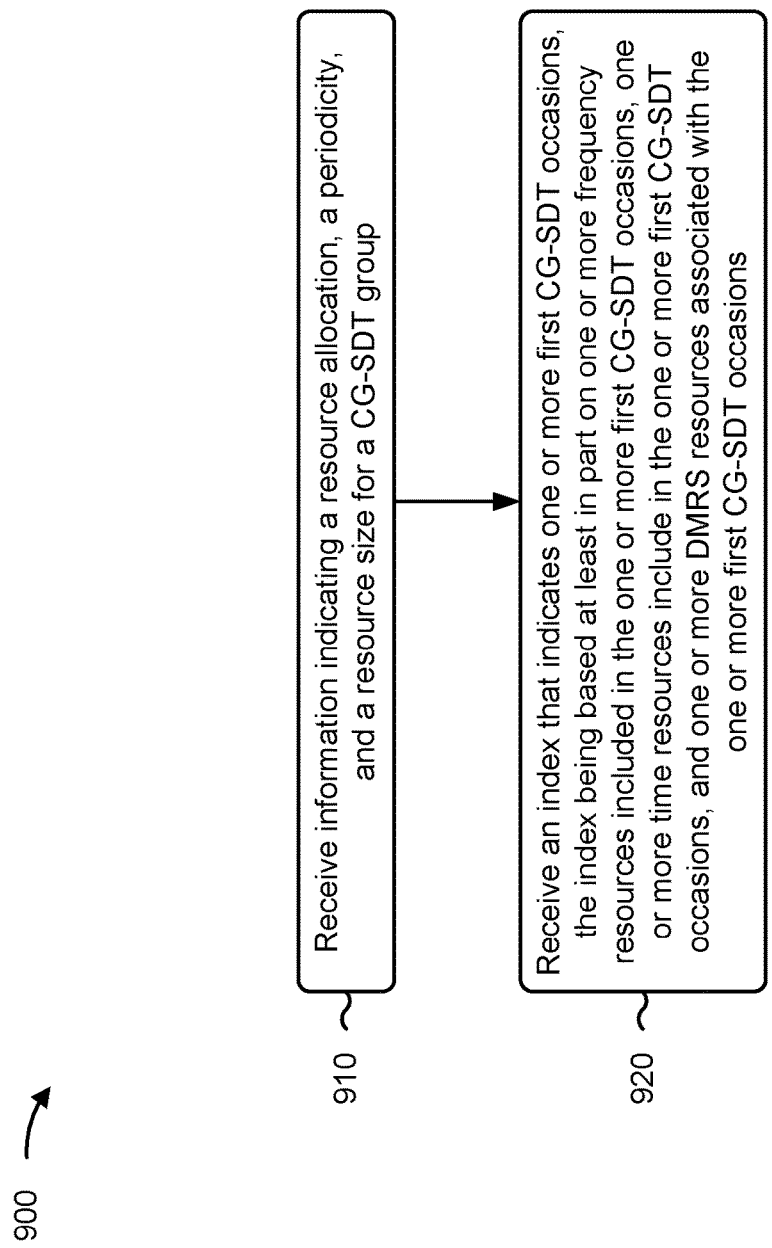
FIGS. 9 and 10 are diagrams illustrating example processes associated with indexing CG-SDT occasions, in accordance with the present disclosure.

FIG. 9 is a diagram illustrating an example process 900 performed, for example, by a UE, in accordance with the present disclosure. Example process 900 is an example where the UE (e.g., UE 120) performs operations associated with indexing CG-SDT occasions.

As shown in FIG. 9, in some aspects, process 900 may include receiving, from a base station (e.g., base station 110), information indicating a radio resource allocation, a periodicity, a transmission scheme, and a resource size for a CG-SDT group including the UE (block 910). For example, the UE (e.g., using antenna 252, modem 254, MIMO detector 256, receive processor 258, controller/processor 280, and/or memory 282) may receive, from a base station, information indicating a resource allocation, a periodicity, and a resource size for a CG-SDT group including the UE, as described herein.

As further shown in FIG. 9, in some aspects, process 900 may include receiving, from the base station, an index that indicates one or more first CG-SDT occasions (block 920). For example, the UE (e.g., using antenna 252, modem 254, MIMO detector 256, receive processor 258, controller/ processor 280, and/or memory 282) may receive, from the base station, an index that indicates one or more first CG-SDT occasions, as described herein. In some aspects, the index is based at least in part on one or more frequency resources included in the one or more first CG-SDT occasions, one or more time resources included in the one or more first CG-SDT occasions, and one or more DMRS resources associated with the one or more first CG-SDT occasions.

Process 900 may include additional aspects, such as any single aspect or any combination of aspects described below and/or in connection with one or more other processes described elsewhere herein.

In a first aspect, the index is sequential based at least in part on an increasing order of the one or more frequency resources, an increasing order of the one or more time resources, and an increasing order of the one or more DMRS resources. This has a technical effect of allowing the base station 110 to assign the index according to handle CG-SDT occasions that share frequency resources, time resources, and/or DMRS resources.

In a second aspect, alone or in combination with the first aspect, the index is sequential based at least in part on one or more rules stored by the UE. This has a technical effect of reducing signaling overhead from the base station 110 by using rules programmed into the UE 120.

In a third aspect, alone or in combination with one or more of the first and second aspects, the index is sequential based at least in part on one or more rules indicated by the base station. This has a technical effect of allowing the base station 110 to dynamically change the rules for assigning the index.

In a fourth aspect, alone or in combination with one or more of the first through third aspects, the information and the index are received in a broadcast message.

In a fifth aspect, alone or in combination with one or more of the first through fourth aspects, the information and the index are received in a UE-specific message.

In a sixth aspect, alone or in combination with one or more of the first through fifth aspects, the information further indicates an MCS, a frequency hopping, and a mapping or repetition scheme in a time domain for the CG-SDT group.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
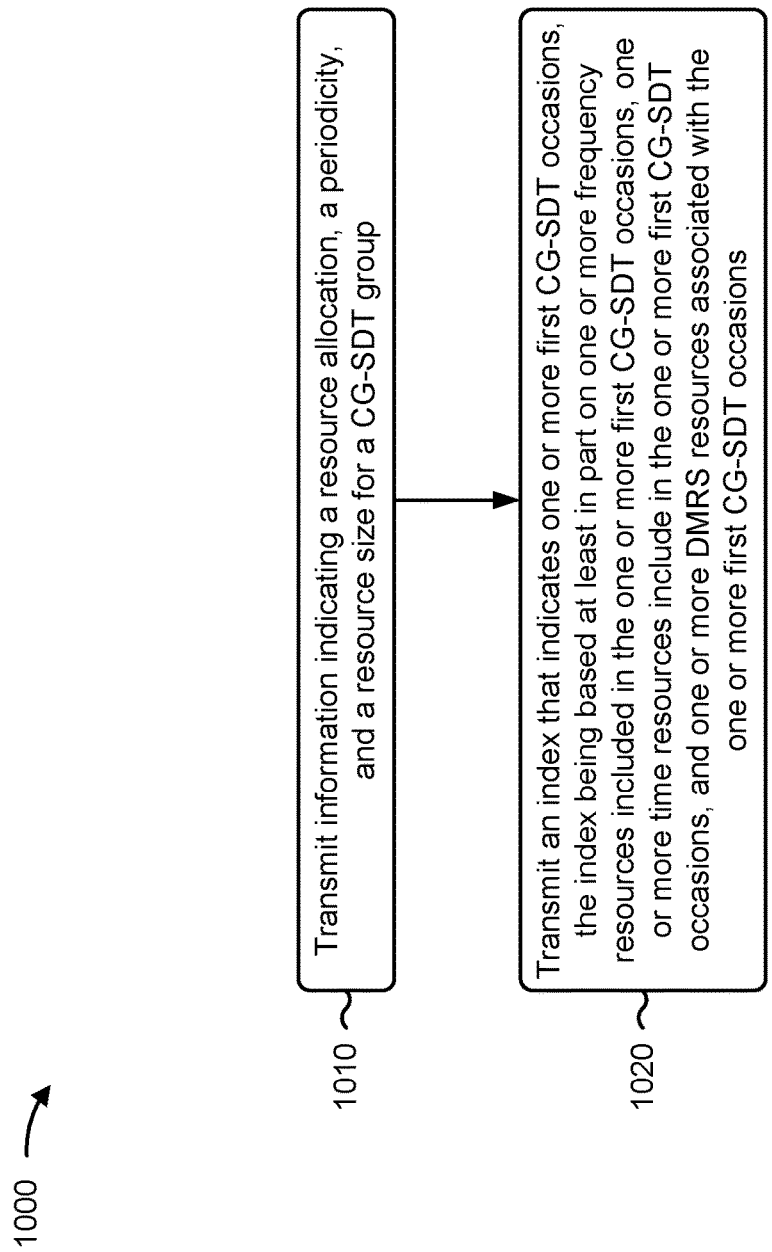

FIG. 10 is a diagram illustrating an example process 1000 performed, for example, by a base station, in accordance with the present disclosure. Example process 1000 is an example where the base station (e.g., base station 110) performs operations associated with indexing CG-SDT occasions.

As shown in FIG. 10, in some aspects, process 1000 may include transmitting, to a UE (e.g., UE 120), information indicating a radio resource allocation, a periodicity, a transmission scheme, and a resource size for a CG-SDT group including the UE (block 1010). For example, the base station (e.g., using transmit processor 220, TX MIMO processor 230, modem 232, antenna 234, controller/processor 240, memory 242, and/or scheduler 246) may transmit, to a UE, information indicating a resource allocation, a periodicity, and a resource size for a CG-SDT group including the UE, as described herein.

As further shown in FIG. 10, in some aspects, process 1000 may include transmitting, to the UE, an index that indicates one or more first CG-SDT occasions (block 1020). For example, the base station (e.g., using transmit processor 220, TX MIMO processor 230, modem 232, antenna 234, controller/processor 240, memory 242, and/or scheduler 246) may transmit, to the UE, an index that indicates one or more first CG-SDT occasions, as described herein. In some aspects, the index is based at least in part on one or more frequency resources included in the one or more first CG-SDT occasions, one or more time resources included in the one or more first CG-SDT occasions, and one or more DMRS resources associated with the one or more first CG-SDT occasions.

Process 1000 may include additional aspects, such as any single aspect or any combination of aspects described below and/or in connection with one or more other processes described elsewhere herein.

In a first aspect, the index is sequential based at least in part on an increasing order of the one or more frequency resources, an increasing order of the one or more time resources, and an increasing order of the one or more DMRS resources.

In a second aspect, alone or in combination with the first aspect, the index is sequential based at least in part on one or more rules stored by the base station.

In a third aspect, alone or in combination with one or more of the first and second aspects, the index is sequential based at least in part on one or more rules indicated, to the UE, by the base station.

In a fourth aspect, alone or in combination with one or more of the first through third aspects, the information and the index are transmitted in a broadcast message.

In a fifth aspect, alone or in combination with one or more of the first through fourth aspects, the information and the index are transmitted in a UE-specific message.

In a sixth aspect, alone or in combination with one or more of the first through fifth aspects, the information further indicates an MCS, a frequency hopping, and a mapping or repetition scheme in a time domain for the CG-SDT group.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

The following provides an overview of some Aspects of the present disclosure:

Aspect 1: A method of wireless communication performed by a user equipment (UE), comprising: receiving, from a base station, a configuration message that indicates a radio resource allocation and a transmission scheme for one or more first configured grant-small data transfer (CG-SDT) occasions and one or more second CG-SDT occasions, wherein the one or more second CG-SDT occasions are at least partially nested, in time, frequency, or a combination thereof, within the one or more first CG-SDT occasions; and transmitting, to the base station, an uplink communication within the one or more first CG-SDT occasions or the one or more second CG-SDT occasions, using the radio resource allocation and the transmission scheme.

Aspect 2: The method of Aspect 1, wherein the one or more first CG-SDT occasions and the one or more second CG-SDT occasions are associated with a same CG-SDT group including the UE.

Aspect 3: The method of any of Aspects 1 through 2, wherein the one or more second CG-SDT occasions are associated with a resource size that is different than a resource size associated with the one or more first CG-SDT occasions.

Aspect 4: The method of any of Aspects 1 through 3, wherein the configuration message indicates frequency hopping for the one or more first CG-SDT occasions or the one or more second CG-SDT occasions.

Aspect 5: The method of any of Aspects 1 through 4, wherein the one or more second CG-SDT occasions are associated with a modulation and coding scheme (MCS) that is different than an MCS associated with the one or more first CG-SDT occasions.

Aspect 6: The method of any of Aspects 1 through 5, wherein the configuration message indicates one or more mappings or repetition schemes in a time domain for a physical uplink shared channel (PUSCH) used to transmit the uplink communication.

Aspect 7: The method of any of Aspects 1 through 6, further comprising: receiving, from the base station and in a search space indicated by the configuration message, a response based at least in part on the uplink communication, wherein the uplink communication is associated with an initial transmission or a retransmission.

Aspect 8: The method of any of Aspects 1 through 7, wherein the uplink communication includes an identifier based at least in part on an index associated with the one or more first CG-SDT occasions or the one or more second CG-SDT occasions that are selected by the UE for a demodulation reference signal (DMRS) and PUSCH transmission.

Aspect 9: The method of any of Aspects 1 through 8, wherein the configuration message further indicates at least one of: one or more search space configurations for a response message, one or more uplink control information (UCI) multiplexing schemes, one or more timing advance validation schemes, one or more power control schemes for initial transmission, or one or more power control schemes for retransmission.

Aspect 10: The method of any of Aspects 1 through 9, further comprising: validating uplink timing alignment, based at least in part on one or more criteria provided by the base station, before transmitting the uplink communication, wherein the uplink communication is transmitted based at least in part on validating the uplink timing alignment.

Aspect 11: The method of any of Aspects 1 through 10, wherein the UE is in an inactive mode, an idle state, or a connected mode.

Aspect 12: A method of wireless communication performed by a base station, comprising: transmitting, to a user equipment (UE), a configuration message that indicates a radio resource allocation and a transmission scheme for one or more first configured grant-small data transfer (CG-SDT) occasions and one or more second CG-SDT occasions, wherein the one or more second CG-SDT occasions are at least partially nested, in time, frequency, or a combination thereof, within the one or more first CG-SDT occasions; and receiving, from the UE, an uplink communication within the one or more first CG-SDT occasions or the one or more second CG-SDT occasions, using the radio resource allocation and the transmission scheme.

Aspect 13: The method of Aspect 12, wherein the one or more first CG-SDT occasions and the one or more second CG-SDT occasions are associated with a same CG-SDT group including the UE.

Aspect 14: The method of any of Aspects 12 through 13, wherein the one or more second CG-SDT occasions are associated with a resource size that is different than a resource size associated with the one or more first CG-SDT occasions.

Aspect 15: The method of any of Aspects 12 through 14, wherein the one or more second CG-SDT occasions are associated with a modulation and coding scheme (MCS) that is different than an MCS associated with the one or more first CG-SDT occasions.

Aspect 16: The method of any of Aspects 12 through 15, wherein the configuration message indicates frequency hopping for the one or more first CG-SDT occasions or the one or more second CG-SDT occasions.

Aspect 17: The method of any of Aspects 12 through 16, wherein the configuration message indicates one or more mappings or repetition schemes in a time domain for a physical uplink shared channel (PUSCH) used to receive the uplink communication.

Aspect 18: The method of any of Aspects 12 through 17, further comprising: transmitting, to the UE and in a search space indicated by the configuration message, a response based at least in part on the uplink communication, wherein the uplink communication is associated with an initial transmission or a retransmission.

Aspect 19: The method of any of Aspects 12 through 18, wherein the uplink communication includes an identifier based at least in part on an index associated with the one or more first CG-SDT occasions or the one or more second CG-SDT occasions that were selected by the UE for a DMRS and PUSCH transmission.

Aspect 20: The method of any of Aspects 12 through 19, wherein the configuration message further indicates at least one of: one or more search space configurations for a response message, one or more uplink control information (UCI) multiplexing schemes, one or more timing advance validation schemes, one or more power control schemes for initial transmission, or one or more power control schemes for retransmission.

Aspect 21: The method of any of Aspects 12 through 20, further comprising: transmitting, to the UE, one or more criteria for validating uplink timing alignment, wherein the uplink communication is received based at least in part on a validation of the uplink timing alignment.

Aspect 22: The method of any of Aspects 12 through 21, wherein the UE is in an inactive mode, an idle state, or a connected mode.

Aspect 23: A method of wireless communication performed by a user equipment (UE), comprising: receiving, from a base station, information indicating a radio resource allocation, a periodicity, a transmission scheme, and a resource size for a configured grant-small data transfer (CG-SDT) group including the UE; and receiving, from the base station, an index that indicates one or more first CG-SDT occasions, wherein the index is based at least in part on one or more frequency resources included in the one or more first CG-SDT occasions, one or more time resources included in the one or more first CG-SDT occasions, and one or more demodulation reference signal (DMRS) resources associated with the one or more first CG-SDT occasions.

Aspect 24: The method of Aspect 23, wherein the index is sequential based at least in part on an increasing order of the one or more frequency resources, an increasing order of the one or more time resources, and an increasing order of the one or more DMRS resources.

Aspect 25: The method of Aspect 24, wherein the index is sequential based at least in part on one or more rules stored by the UE.

Aspect 26: The method of any of Aspects 24 through 25, wherein the index is sequential based at least in part on one or more rules indicated by the base station.

Aspect 27: The method of any of Aspects 23 through 26, wherein the information and the index are received in a broadcast message.

Aspect 28: The method of any of Aspects 23 through 27, wherein the information and the index are received in a UE-specific message.

Aspect 29: The method of any of Aspects 23 through 28, wherein the information further indicates an MCS, a frequency hopping, and a mapping or repetition scheme in a time domain for the CG-SDT group.

Aspect 30: A method of wireless communication performed by a base station, comprising: transmitting, to a user equipment (UE), information indicating a radio resource allocation, a periodicity, a transmission scheme, and a resource size for a configured grant-small data transfer (CG-SDT) group including the UE; and transmitting, to the UE, an index that indicates one or more first CG-SDT occasions, wherein the index is based at least in part on one or more frequency resources included in the one or more first CG-SDT occasions, one or more time resources included in the one or more first CG-SDT occasions, and one or more demodulation reference signal (DMRS) resources associated with the one or more first CG-SDT occasions.

Aspect 31: The method of Aspect 30, wherein the index is sequential based at least in part on an increasing order of the one or more frequency resources, an increasing order of the one or more time resources, and an increasing order of the one or more DMRS resources.

Aspect 32: The method of Aspect 31, wherein the index is sequential based at least in part on one or more rules stored by the base station.

Aspect 33: The method of any of Aspects 31 through 32, wherein the index is sequential based at least in part on one or more rules indicated, to the UE, by the base station.

Aspect 34: The method of any of Aspects 30 through 33, wherein the information and the index are transmitted in a broadcast message.

Aspect 35: The method of any of Aspects 30 through 34, wherein the information and the index are transmitted in a UE-specific message.

Aspect 36: The method of any of Aspects 30 through 35, wherein the information further indicates an MCS, a frequency hopping, and a mapping or repetition scheme in a time domain for the CG-SDT group.

Aspect 37: An apparatus for wireless communication at a device, comprising a processor; memory coupled with the processor; and instructions stored in the memory and executable by the processor to cause the apparatus to perform the method of one or more of Aspects 1-11.

Aspect 38: A device for wireless communication, comprising a memory and one or more processors coupled to the memory, the one or more processors configured to perform the method of one or more of Aspects 1-11.

Aspect 39: An apparatus for wireless communication, comprising at least one means for performing the method of one or more of Aspects 1-11.

Aspect 40: A non-transitory computer-readable medium storing code for wireless communication, the code comprising instructions executable by a processor to perform the method of one or more of Aspects 1-11.

Aspect 41: A non-transitory computer-readable medium storing a set of instructions for wireless communication, the set of instructions comprising one or more instructions that, when executed by one or more processors of a device, cause the device to perform the method of one or more of Aspects 1-11.

Aspect 42: An apparatus for wireless communication at a device, comprising a processor; memory coupled with the processor; and instructions stored in the memory and executable by the processor to cause the apparatus to perform the method of one or more of Aspects 12-22.

Aspect 43: A device for wireless communication, comprising a memory and one or more processors coupled to the memory, the one or more processors configured to perform the method of one or more of Aspects 12-22.

Aspect 44: An apparatus for wireless communication, comprising at least one means for performing the method of one or more of Aspects 12-22.

Aspect 45: A non-transitory computer-readable medium storing code for wireless communication, the code comprising instructions executable by a processor to perform the method of one or more of Aspects 12-22.

Aspect 46: A non-transitory computer-readable medium storing a set of instructions for wireless communication, the set of instructions comprising one or more instructions that, when executed by one or more processors of a device, cause the device to perform the method of one or more of Aspects 12-22.

Aspect 47: An apparatus for wireless communication at a device, comprising a processor; memory coupled with the processor; and instructions stored in the memory and executable by the processor to cause the apparatus to perform the method of one or more of Aspects 23-29.

Aspect 48: A device for wireless communication, comprising a memory and one or more processors coupled to the memory, the one or more processors configured to perform the method of one or more of Aspects 23-29.

Aspect 49: An apparatus for wireless communication, comprising at least one means for performing the method of one or more of Aspects 23-29.

Aspect 50: A non-transitory computer-readable medium storing code for wireless communication, the code comprising instructions executable by a processor to perform the method of one or more of Aspects 23-29.

Aspect 51: A non-transitory computer-readable medium storing a set of instructions for wireless communication, the set of instructions comprising one or more instructions that, when executed by one or more processors of a device, cause the device to perform the method of one or more of Aspects 23-29.

Aspect 52: An apparatus for wireless communication at a device, comprising a processor; memory coupled with the processor; and instructions stored in the memory and executable by the processor to cause the apparatus to perform the method of one or more of Aspects 30-36.

Aspect 53: A device for wireless communication, comprising a memory and one or more processors coupled to the memory, the one or more processors configured to perform the method of one or more of Aspects 30-36.

Aspect 54: An apparatus for wireless communication, comprising at least one means for performing the method of one or more of Aspects 30-36.

Aspect 55: A non-transitory computer-readable medium storing code for wireless communication, the code comprising instructions executable by a processor to perform the method of one or more of Aspects 30-36.

Aspect 56: A non-transitory computer-readable medium storing a set of instructions for wireless communication, the set of instructions comprising one or more instructions that, when executed by one or more processors of a device, cause the device to perform the method of one or more of Aspects 30-36.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
receiving, from a network entity, a configuration message that indicates a radio resource allocation and a transmission scheme for one or more first configured grant-small data transfer (CG-SDT) occasions associated with a first set of time resources and a first set of frequency resources and one or more second CG-SDT occasions, wherein the one or more second CG-SDT occasions are associated with at least one of: a second set of time resources that include at least a subset of the first set of time resources, or a second set of frequency resources that include at least a subset of the first set of frequency resources; and
transmitting, to the network entity, an uplink communication within the one or more first CG-SDT occasions or the one or more second CG-SDT occasions, using the radio resource allocation and the transmission scheme.

2. The method of claim 1, wherein the one or more first CG-SDT occasions and the one or more second CG-SDT occasions are associated with a same CG-SDT group including the UE.

3. The method of claim 1, wherein the one or more second CG-SDT occasions are associated with a resource size that is different than a resource size associated with the one or more first CG-SDT occasions.

4. The method of claim 1, wherein the configuration message indicates at least one of:
frequency hopping for the one or more first CG-SDT occasions or the one or more second CG-SDT occasions, or
one or more mappings or repetition schemes in a time domain for a data channel used to transmit the uplink communication.

5. The method of claim 1, wherein the one or more second CG-SDT occasions are associated with a modulation and coding scheme (MCS) that is different than an MCS associated with the one or more first CG-SDT occasions.

6. The method of claim 1, further comprising:
receiving, from the network entity and in a search space indicated by the configuration message, a response based at least in part on the uplink communication, wherein the uplink communication is associated with an initial transmission or a retransmission.

7. The method of claim 1, wherein the uplink communication includes an identifier based at least in part on an index associated with the one or more first CG-SDT occasions or the one or more second CG-SDT occasions that are selected by the UE for a demodulation reference signal and physical uplink shared channel transmission.

8. The method of claim 1, wherein the configuration message further indicates at least one of:
one or more search space configurations for a response message,
one or more uplink control information multiplexing schemes,
one or more timing advance validation schemes,
one or more power control schemes for initial transmission, or
one or more power control schemes for retransmission.

9. The method of claim 1, further comprising:
validating uplink timing alignment, based at least in part on one or more criteria provided by the network entity, before transmitting the uplink communication,
wherein the uplink communication is transmitted based at least in part on validating the uplink timing alignment.

10. A method of wireless communication performed by a network entity, comprising:
transmitting, to a user equipment (UE), a configuration message that indicates a radio resource allocation and a transmission scheme for one or more first configured grant-small data transfer (CG-SDT) occasions associated with a first set of time resources and a first set of frequency resources and one or more second CG-SDT occasions, wherein the one or more second CG-SDT occasions are associated with at least one of: a second set of time resources that include at least a subset of the first set of time resources, or a second set of frequency resources that include at least a subset of the first set of frequency resources; and
receiving, from the UE, an uplink communication within the one or more first CG-SDT occasions or the one or more second CG-SDT occasions, using the radio resource allocation and the transmission scheme.

11. The method of claim 10, wherein the one or more first CG-SDT occasions and the one or more second CG-SDT occasions are associated with a same CG-SDT group including the UE.

12. The method of claim 10, wherein the one or more second CG-SDT occasions are associated with a modulation and coding scheme (MCS) that is different than an MCS associated with the one or more first CG-SDT occasions.

13. The method of claim 10, wherein the configuration message indicates frequency hopping for the one or more first CG-SDT occasions or the one or more second CG-SDT occasions.

14. The method of claim 10, wherein the configuration message indicates one or more mappings or repetition schemes in a time domain for data channel used to receive the uplink communication.

15. The method of claim 10, further comprising:
transmitting, to the UE and in a search space indicated by the configuration message, a response based at least in part on the uplink communication, wherein the uplink communication is associated with an initial transmission or a retransmission.

16. The method of claim 10, wherein the uplink communication includes an identifier based at least in part on an index associated with the one or more first CG-SDT occasions or the one or more second CG-SDT occasions that were selected by the UE for a demodulation reference signal and physical uplink shared channel transmission.

17. A method of wireless communication performed by a user equipment (UE), comprising:
receiving, from a network entity, information indicating a radio resource allocation, a periodicity, a transmission scheme, and a resource size for a configured grant-small data transfer (CG-SDT) group including the UE; and
receiving, from the network entity, an index that indicates one or more first CG-SDT occasions, wherein the index is based at least in part on one or more frequency resources included in the one or more first CG-SDT occasions, one or more time resources included in the one or more first CG-SDT occasions, and one or more demodulation reference signal resources associated with the one or more first CG-SDT occasions.

18. The method of claim 17, wherein the index is sequential based at least in part on an increasing order of the one or more frequency resources, an increasing order of the one or more time resources, and an increasing order of the one or more demodulation reference signal resources.

19. The method of claim 17, wherein the information and the index are received in a broadcast message.

20. The method of claim 17, wherein the information further indicates a modulation and coding scheme, a frequency hopping, and a mapping or repetition scheme in a time domain for the CG-SDT group.

* * * * *